US008384583B2

(12) United States Patent
Leva et al.

(10) Patent No.: US 8,384,583 B2
(45) Date of Patent: Feb. 26, 2013

(54) SYNTHETIC-APERTURE RADAR SYSTEM AND OPERATING METHOD FOR MONITORING GROUND AND STRUCTURE DISPLACEMENTS SUITABLE FOR EMERGENCY CONDITIONS

(75) Inventors: Davide Leva, Varese (IT); Carlo Rivolta, Lissone (IT)

(73) Assignee: Ellegi S.R.L., Milan (IT)

( * ) Notice: Subject to any disclaimer, the term of this patent is extended or adjusted under 35 U.S.C. 154(b) by 331 days.

(21) Appl. No.: 12/802,400

(22) Filed: Jun. 7, 2010

(65) Prior Publication Data
US 2011/0298655 A1 Dec. 8, 2011

(51) Int. Cl.
*G01S 13/90* (2006.01)
(52) U.S. Cl. ............ 342/25 C; 342/52; 342/53; 342/54; 342/66; 342/75; 342/156; 342/160; 342/180; 342/188
(58) Field of Classification Search ................ 342/25 R, 342/25 A–25 F, 52–55, 66, 74–75, 81, 156, 342/159–162, 180, 188, 191
See application file for complete search history.

(56) References Cited

U.S. PATENT DOCUMENTS

| | | | | |
|---|---|---|---|---|
| 5,708,436 | A * | 1/1998 | Loiz et al. ................... | 342/25 A |
| 6,072,419 | A * | 6/2000 | Normant ..................... | 342/25 F |
| 6,608,585 | B2 * | 8/2003 | Benitz ......................... | 342/25 R |
| 8,154,435 | B2 * | 4/2012 | Pett et al. .................... | 342/25 R |
| 2003/0189512 | A1 * | 10/2003 | Chen et al. .................. | 342/160 |
| 2004/0017307 | A1 * | 1/2004 | Cirillo et al. .................. | 342/25 |
| 2007/0257835 | A1 * | 11/2007 | Cirillo et al. .................. | 342/195 |
| 2010/0045513 | A1 * | 2/2010 | Pett et al. .................... | 342/25 C |
| 2011/0298655 | A1 * | 12/2011 | Leva et al. .................. | 342/25 C |
| 2011/0299733 | A1 * | 12/2011 | Jahangir et al. ............... | 382/103 |

OTHER PUBLICATIONS

Lavalle, M.; Solimini, D.; Pottier, E.; Desnos, Y.-L.; , "Compact polarimetric SAR interferometry," Radar, Sonar & Navigation, IET, vol. 4, No. 3, pp. 449-456, Jun. 2010.*
Pasquali, P.; Holecz, F.; Small, D.; Michel, T.; , "Calibration and classification of SIR-C polarimetric and interferometric SAR data in areas with slope variations," Geoscience and Remote Sensing, 1997. IGARSS '97. Remote Sensing—A Scientific Vision for Sustainable Development., 1997 IEEE Int'l, vol. 1, No., pp. 448-450 vol. 1, Aug. 3-8, 1997.*
Cloude, S.R.; Papathanassiou, K.P.; , "Polarimetric SAR interferometry," Geoscience and Remote Sensing, IEEE Transactions on , vol. 36, No. 5, pp. 1551-1565, Sep. 1998.*

(Continued)

*Primary Examiner* — John B Sotomayor
(74) *Attorney, Agent, or Firm* — Hedman & Costigan, P.C.

(57) ABSTRACT

A synthetic-aperture radar system, and related operating method, for the monitoring of ground and structure movements, particularly suitable for emergency conditions, characterized by a ground based platform with polarimetric capabilities, that able to quickly acquire, embeddedly process and post-process data by a novel data acquisition "On the Fly" mode of operation, reducing by at least an order of magnitude the data acquisition time. The inventive system characteristics allows to achieve on-field measurement results on three-dimensional maps georeferenced to absolute coordinate systems (WGS84, Gauss-Boaga, and so on). The operating method includes the step of installing the system, the acquiring of the first measurements, the quick data processing and post-processing to provide sub-millimetric precision georeferenced bi-dimensional and three-dimensional displacement maps for the objects belonging to the monitored scenario, with an improved performance and in a measurement time compatible to that required in an emergency condition, with an higher degree of integration with other sensors and autonomously and embeddendly.

7 Claims, 17 Drawing Sheets
(5 of 17 Drawing Sheet(s) Filed in Color)

OTHER PUBLICATIONS

Boerner, W.-M.; , "Recent Advances in Polarimetry and Polarimetric Interferometry," Geoscience and Remote Sensing Symposium, 2006. IGARSS 2006. IEEE International Conference on , vol., No., pp. 49-51, Jul. 31, 2006-Aug. 4, 2006.*

* cited by examiner

SYNTHETIC-APERTURE RADAR SYSTEM AND OPERATING METHOD FOR MONITORING GROUND AND STRUCTURE DISPLACEMENTS SUITABLE FOR EMERGENCY CONDITIONS

BACKGROUND OF THE INVENTION

The present invention relates to a synthetic-aperture radar system and a connected operating method for monitoring ground and structure displacements, particularly suitable for emergency conditions.

More specifically, the invention relates to a novel synthetic aperture radar sensor with a ground based platform and having interferometric and polarimetric capabilities as to be easily used on field for acquiring and processing in short time data and for immediately using and displaying the processing results.

This sensor is suitable for monitoring hydrogeological instabilities such as landslides, landslips, avalanches, volcanoes and so on, settlings and yieldings of antropic structures such as dams, bridges, buildings and so on, but it is especially suitable for emergency conditions.

In such conditions, the radar system installation and setting up, the beginning of the measurements and the achievement of early results must be accomplished within few tens of minutes so that the rescue personnel intervention could take place as fastest as possible and, above all, in a top safety condition.

Typical examples of emergency conditions are incipient landslides, man-made structures and buildings instabilities and so on.

As it is known, interferometric radar techniques or methods are conventionally used to recover, for different purposes, radar images positional information.

Regardless of the particular application, the radar interferometry technique is based on quantitative comparison of two images of the same scene acquired from positions and at times that, depending on the particular application, may or may not coincide.

The differential interferometry allows, through the comparison of the phases of the signals belonging to two temporally separated acquisitions, to extract a quantitative information concerning the movement of the various portions of the observed scene, that took place between the two acquisitions.

The movements detected by the mentioned radar system, are the projections of the real displacements along the direction connecting the radar to the moving object that is called LOS (Line Of Sight).

This makes possible to measure displacements of the order of the emitted radiation wavelength, typically between a few centimeters and a few millimeters, with accuracies equal to a fraction of the said wavelength, or rather in the most common applications with precision and accuracy levels between 0.3 and 0.7 mm One of the main applications of differential interferometry is in the field of environmental risks monitoring and in particular in the monitoring of all those phenomena that cause movements of the observed scenario.

Radar interferometry methods can be carried out either by satellite, airborne or ground based sensors.

For small scale and great precision movements monitoring, the above mentioned satellite and airborne sensors have limitations that can be avoided using ground based sensors.

Ground based sensors retain all the typical advantages of radar devices, such as the remote sensing capabilities and the independence from the illumination conditions, while offering maximum flexibility in terms of revisiting time, acquisition geometry, polarization, selectable frequency of the electromagnetic wave transmitted and easy installation (even within a short notice time), thereby assuring the best fitting to any situation.

Moreover, ground based sensors used in differential interferometry applications provide technical simplifications in repeating the acquisitions from the same position, that is known as the "zero baseline" configuration.

However, in locating a suitable position for the system installation, the main difficulties are found during the installation operations.

The installation of the system must be performed on a basement that will grant stability over time and, when needed, the technical solutions to allow the periodical relocation of the system for any future repetition of the measurements.

A ground based synthetic aperture radar is a sensor system typically consisting of two parts, the first one is mainly mechanical and the second one is mainly constituted by electronic and electromagnetic components.

The mechanical part comprises one or two motor driven linear units, usually having a length of a few meters, with a sliding carriage used to support and displace along the unit the electronic module which is firmly anchored to the carriage.

The electronic module comprises a coherent electromagnetic wave emitter/receiver that uses one or two antennas that are carried along on the carriage as well.

The management of the two main electronic and mechanical modules is usually carried out by an external computer that each time has to be physically connected to the sensor system in order to set the measurement, system operating parameters and starting up the acquisitions.

Each individual measurement is usually carried out by a so-called "Stop & Go" method: the carriage is driven along the linear unit and stopped at a number of discrete steps, spaced at constant distance from one another; for each step a band of electromagnetic waves is emitted and the echo coming from the objects hit by the electromagnetic waves is received.

After receiving the electromagnetic echo the carriage is then moved to the following step along the linear unit where a new measurement cycle is repeated.

As the carriage has covered the overall linear unit length and performed measurements at all the discrete steps, the acquired data are transferred from the measurement system to a external or remote computer that applying dedicated algorithms (called focalizing algorithms) will generate the desired radar images.

Using at least two radar images, from the comparison of their homologous pixels signal phases and performing the difference of these phases a third image, called interferogram, is obtained.

The interferogram allows to derive the displacements of the objects belonging to the observed scenario.

The above process is usually carried out by external or remote computers and requires at least a number of, minutes just for processing a single image.

The time for a full scanning covering all the linear unit length depends on many factors, such as the number of discrete carriage stop positions where the individual measurements are carried out, the mechanical part driving speed and the time required at each step for emitting and receiving the electromagnetic waves.

The main factor to be considered in calculating a full scanning time is the time required to physically displace the carriage hundreds of times to the different constantly spaced discrete steps.

The time required for a complete single scanning is usually of the order of about ten minutes.

Thus, a main disadvantage of these systems is that the minimum time for obtaining two individual images and for processing the related data to achieve an interferogram representing the displacements of the objects belonging to the observed scenario is of the order of tens of minutes.

In fact it is necessary to acquire the raw data for the first image, transfer said raw data to be processed by an external computer, and perform an identical procedure for the second image.

The two images complex data must be further processed to achieve an interferogram and apply algorithms for the removal of variable atmospherics disturbance and noise occurred either in the time interval between the two acquisitions or during the acquisition of a single image.

Therefore, quickly moving objects in the observed scenario such as cars, volcanic lava effusions, harbored ships, sea waves, fast landslips and debris flow and so on, cannot be monitored since this kind of radar systems can only supply indications on the displacements of objects moving just a few millimeters in a time period required to acquire the data needed for a single image creation.

The Italian Patent Application No. FI2001A000064 relates to the above mentioned application field.

Thus, up-to-date ground-based radar sensing assemblies, because of the synthetic aperture technique characteristics they are based upon, and since they operate by an interferometric method, have several main limits hindering their use in many operating applications, said limits include:

1. A very low measurement speed;
2. The systems cannot be easily installed and does not have a suitable operating autonomy;
3. A great difficulty in fitting the system hardware to specific requirements of the phenomena to be monitored;
4. It is very difficult to transport the system to or through scarcely accessible and impassable regions;
5. It is not possible to real time supply data, information and alarms;
6. It is not possible to real time and remotely control and send information without an external PC permanently connected to the system;
7. It is very difficult to provide systems which, upon many mechanical component disassembling, reassembling and mechanical parts replacing operations are still suitable to provide measurements consistent with those acquired before these operations;
8. It is not possible to provide consistent results by a coordinate system different from the intrinsic coordinate frame of the radar system, this latter limitation reduces greatly the system efficiency with respect to other sensing systems, if it is required or desired to compare results with those of other different monitoring systems and it is therefore required a georeferencing of the system results to geographic coordinate systems different from its intrinsic coordinate frame.

SUMMARY OF THE INVENTION

The aim of the present invention is to provide a synthetic aperture radar system and an operating procedure for the monitoring of ground and structure displacements, which is particularly suitable for emergency conditions, and have improved performances in relation to existing ground based radar sensors.

Within the scope of the above mentioned aim, a main objective of the invention is to provide a system capable of performing measurements at a greater measuring speed due to the fact that this new system does not require the carriage to be stopped hundreds of times during the single measurement scanning but it can be driven at a constant speed during each scanning, according an "on the fly" acquisition method object of this invention.

The above mentioned aim, as well as other scopes which will be discussed hereinafter, are achieved by a synthetic aperture radar system and an operating method for the ground and structure movements monitoring, also suitable for emergency conditions.

This new radar system may be installed in a very easy and quick manner since it comprises mechanical tripod assemblies which can be quickly deployed, quick couplings for all its mechanical modules, a minimum number of wiring connections and since it may set or recover the measurement parameters through an alphanumeric display and keypad without the need of using an external PC.

The radar system according to the present invention allows to provide early results in a very short time since the related measurements are carried out in an "On the Fly" mode of operation, as it will be disclosed in a more detailed manner hereinafter, and since it further comprises an on-board a main control unit capable of processing data without using an external and/or remotely located PC and of georeferencing the processed data to all the most common general coordinate systems, such as WGS84, Gauss-Boaga, and so on.

Moreover, the radar system according to the present invention comprises a plurality of built-in modules allowing it to operate in a very flexible operating manner. These modules are, for example, a GPS receiver, a GSM/GPRS/UMTS modem, a LAN, a WLAN, a digital videocamera/photocamera and an I/O managing unit.

The system has a great operating autonomy to set, start and stop measurements, without the need of connecting it to any external PC.

The system may moreover easily fit the instrument hardware components to a target application.

In addition, said system may also be disassembled into several parts to facilitate its shipment and portability.

The system also allows supplying data, information, alarms and controls to/from remote locations through different physical connections or even by a wireless mode of operation.

The system may be also used after mechanical component disassembling, reassembling and replacing operations, still providing measurements coherent with those made before the latter operations.

The system comprises a power supply and data transmission unit coupled to the system through a single coupling connection to speed up on field deployment operations, without the need of performing an excessive number of installing operations not compatible to the on field operating requirements.

The system can provide measurements results according to an external frame of reference and it can be integrated with other built-in systems for the acquisition of digital terrain models being equipped with a GPS receiver and a standard housing both for conventional topographic instrument reflectors (theodolites or total stations) and for laser scanners.

The system may be completely remotely controlled and is able to send notifications about the general system status by sms and mms messages or even by e-mail.

The system may also be remotely interrogated about its general operating status, stopped and restarted again; moreover, its control unit periodically checks the power supply status and can switch to a standby condition the overall apparatus in case of a power line fault. If the system has switched to its stand-by mode, it will be automatically restarted once the power line is recovered.

All the above characteristics allow the inventive synthetic aperture radar system to be particularly suitable for emergency conditions.

The operating procedure implemented by the inventive system provides the following advantages:
- very short system installing and starting times;
- the data and measurement parameters and system control parameters setting can be performed using a system connected alphanumeric keypad and display, thereby obviating the need of using an external PC in performing the system installation operations;
- to process images in:
  - a single image acquisition time of very few seconds;
  - an immediate data processing and post-processing;
- the data analysis is performed by the system, thereby providing the user with immediately available processed data, without requiring further processing operations at an external/remote location;
- a full built-in capability with other measurement instruments, since the inventive system comprises instruments, components and mechanical interfaces allowing to perform topographic measurements, or by means of a laser scanner or by retrieving digital elevation models of the terrain and the immediate georeferencing of the system.

The inventive system and operating procedure provide many further advantages.

In fact, acquiring data in a very short time using "on the fly" method allows very fast dynamics phenomena to be easily monitored.

Accordingly, by reducing by one or two orders the acquisition times using "on the fly" method, it is possible to monitor object displacements by two or more rate order larger.

Up to now it was not possible to monitor by means of synthetic aperture radar interferometry and ground based sensors those phenomena such as a lava effusion from a volcano summit, an abrupt detachment of rocks from rock walls, mudslides, fast structural yieldings or displacements of large size transport means such as ships, and so on.

The possibility of exploiting very short installation and measurement parameter setting times and a nearly instantaneous data processing allows to use this sensing system in emergency activities where an immediate information availability has a fundamental importance.

The novel system is based on the creation of a ground-based synthetic aperture radar sensor which may be installed and acquire, process and post-process data in a very quick manner making it operatively suited for commercial and operative applications even in emergency conditions, and being further adapted to monitor phenomena having dynamics much more quicker than those successfully monitored up to now.

The inventive system comprises mechanical features allowing it to be quickly deployed on field.

Moreover, to assure time consistent measurements, it is designed and built in order to have a synthetic aperture reference, with respect to its zero point, on all the mechanical components within the required precision range.

This solution actually allows each individual mechanical component and modules of the system to be disassembled and reassembled again in the same position with a tolerance degree suitable to the requirements of the interferometric technique.

Thus, servicing and repairing activities, and on-field disassembling and reassembling operations allow a same system to perform consistent measurements along time even after repairing or extraordinary maintenance operation and also to use different measuring head assuring the consistency and the repeatability of the measurements.

The system is moreover suitable for acquiring and processing data in a fully autonomous manner, without requiring auxiliary and external processing means.

In addition, an alphanumeric keypad connected to a display allows to easily and quickly set the measurement parameters.

In particular, the measuring head supporting carriage is driven with a constant driving speed from the start to the end of the track in the "on the fly" mode, thereby reducing by one or two orders each individual image acquisition time.

BRIEF DESCRIPTION OF THE DRAWINGS

The patent or application file contains at least one drawing executed in color. Copies of this patent or patent application publication with color drawing(s) will be provided by the Office upon request and payment of the necessary fee Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
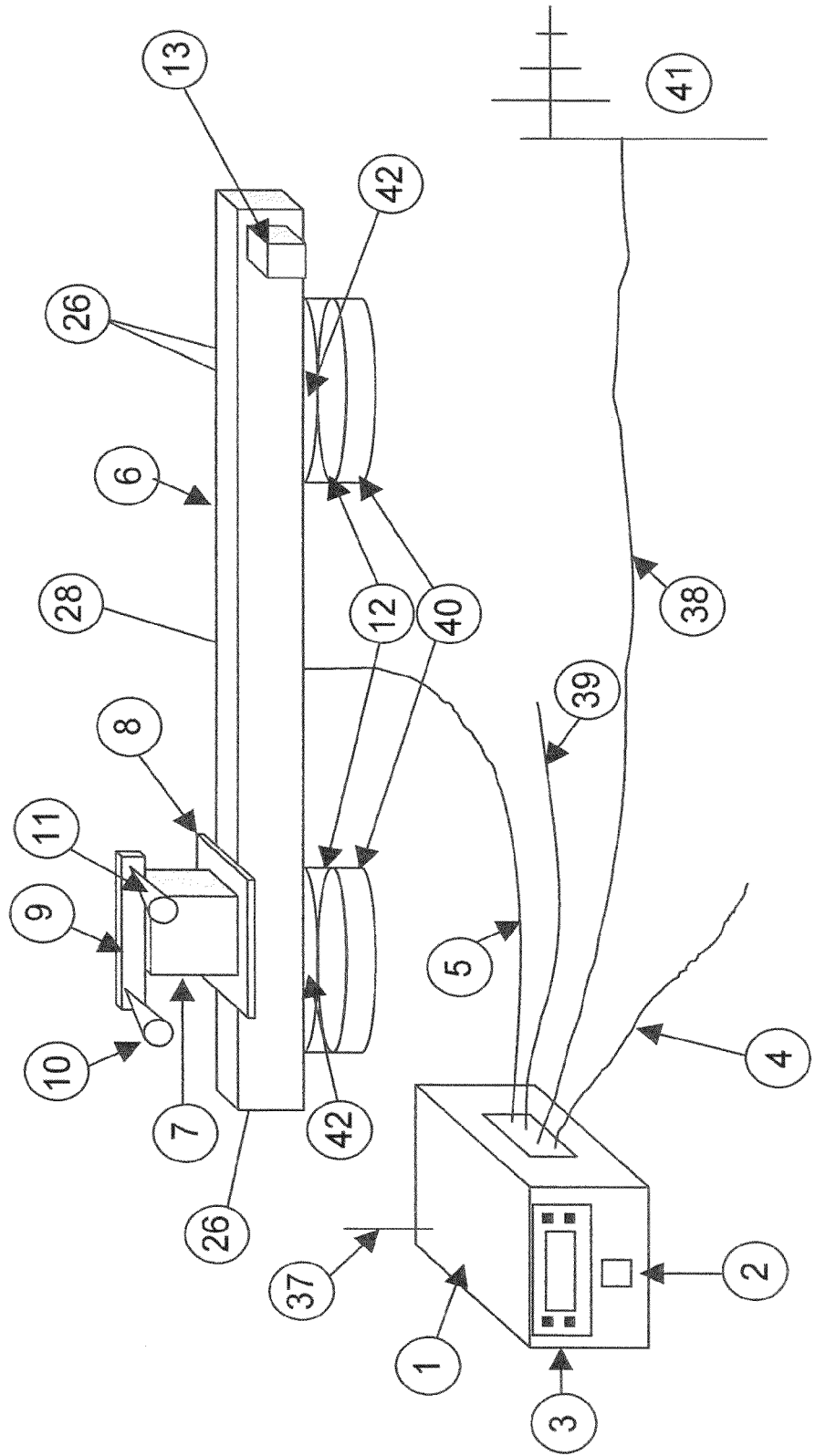
FIG. 1 is a schematic perspective view of the radar system according to the present invention.
Figure 2:
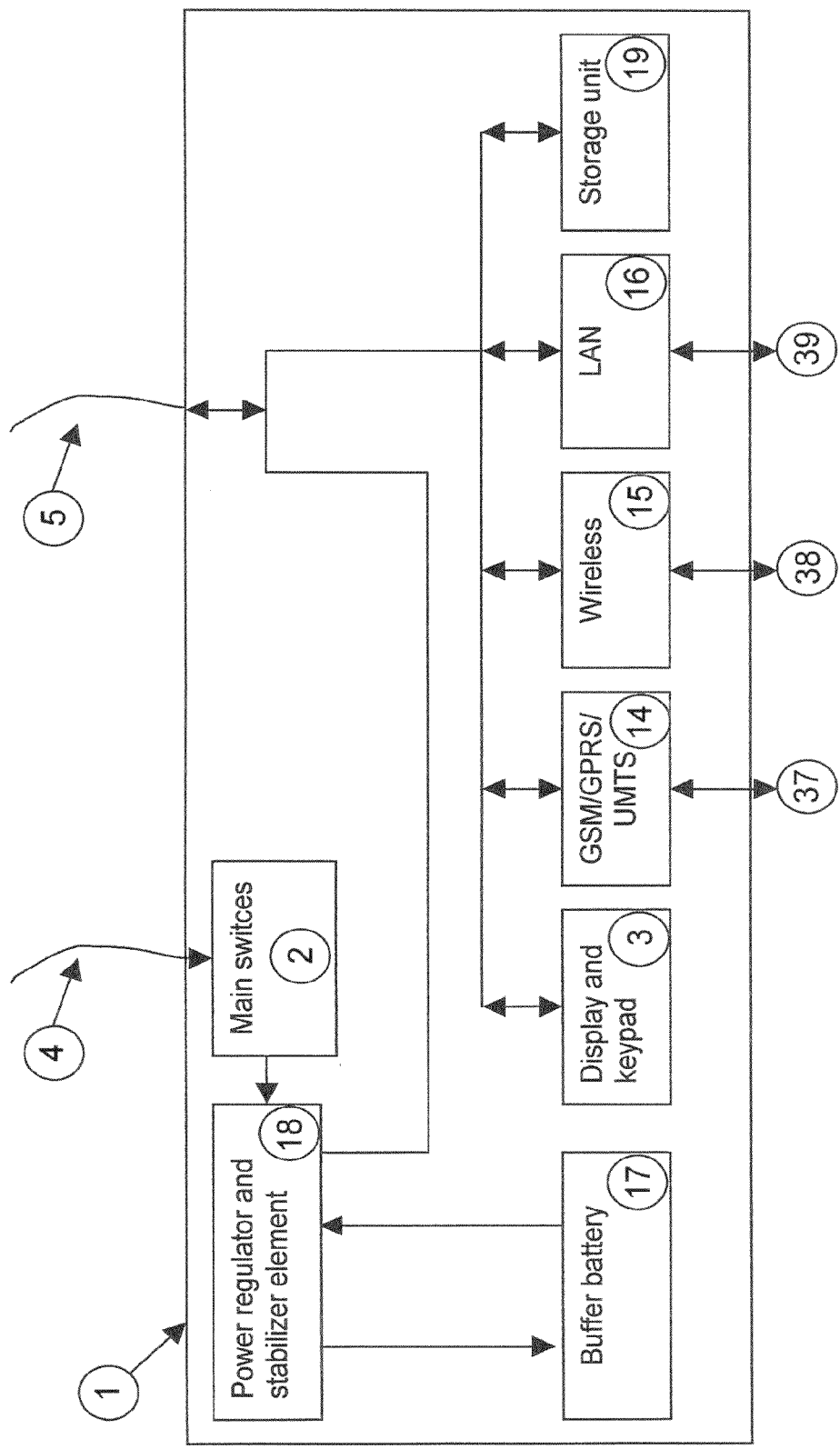
FIG. 2 is a diagram showing the system components.
Figure 3:
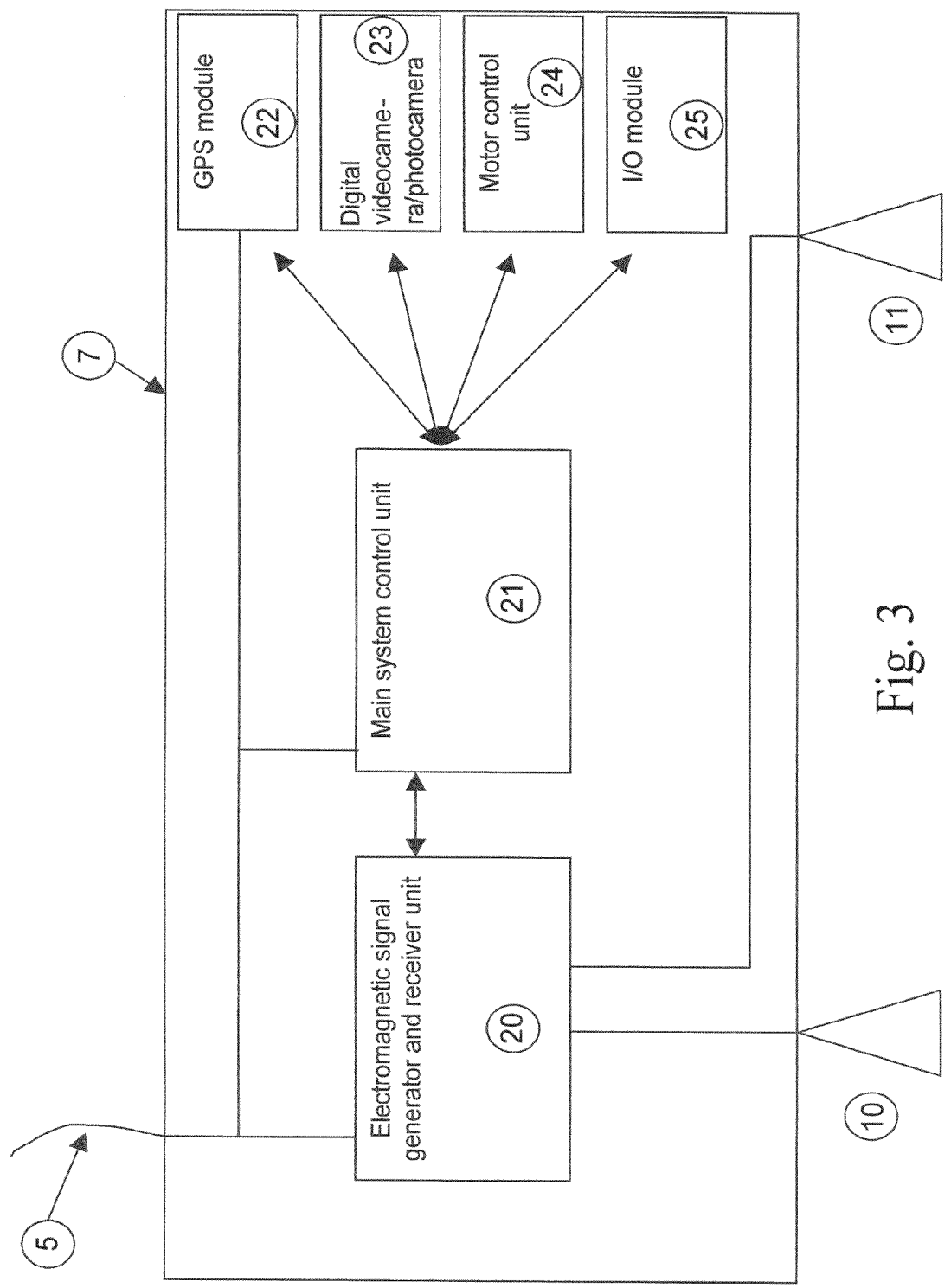
FIG. 3 is another diagram further illustrating the system according to the present invention.

In the figures, number references have the following meaning:
1. Power supply and connection unit
2. Main switch
3. Alphanumeric display with keypad
4. Power cable (Power line—Unit 1)
5. Umbilical cable
6. Linear Positioner
7. Measuring head
8. Reference counter-plate
9. Mechanical module (for the orientation of the antennas)
10. Transmitting antenna
11. Receiving antenna
12. Linear positioner fixing plate
13. Electric motor, geared unit and encoder
14. GSM/GPRS/UMTS transmission and receiver module
15. WLAN module
16. LAN module
17. Buffer battery
18. Regulator and stabilizer element
19. Storage unit
20. Electromagnetic signal generator and receiver unit
21. Main system control unit
22. GPS module
23. Digital videocamera/photocamera
24. Motor control unit
25. I/O module
26. Zero and runout sensors
27. Microwave coupler
28. Junction box
29. Laser scanner assembly flange
30. Deployable tripods
31. Concrete/cement pedestal
32. Composite concrete/cement columns and metallic H beam pedestal
33. Antennas fixing screws
34. Antennas flange
35. Antennas recessed profile
36. Connecting cable measuring head-junction box
37. GSM/GPRS/UMTS modem antenna
38. WLAN coupling cable
39. Ethernet cable
40. System pedestal counter-plates
41. WLAN antenna
42. References for topographic measurements
43. Microwave amplifier With reference to the above mentioned figures, the synthetic aperture radar system according to the present invention substantially comprises three parts: a power supply and connection unit 1, a linear positioner 6 and a measuring head 7.

The main body of the system is constituted by the linear positioner 6 and measuring head 7, and it is supplied by the power supply and connection unit 1 coupled to an external power supply source.

The supply source may independently consists of an electric mains or an autonomous source or generator that are connected to the radar system through the cable 4 including a quick plug connection directly coupled to said power supply and connection unit 1 through the main switch 2.

This unit distributes electric power as preliminarily transformed and regulated or stabilized by the regulator and stabilizer element 18 to the measuring head 7 through the single umbilical cable 5 including quick coupling connectors.

This cable, in addition to transferring power for supplying the measuring head 7 allows data and information, as well as commands, to be transferred from the measuring head 7 to the power supply and connection unit 1.

As stated, the umbilical cable 5 is a single cable to allow the system to be easily installed and reduce to a minimum the operations necessary for installing the system on the field.

In fact, the above unit 1, in addition to including the overall system main switch 2, further comprises integrated on units body an alphanumeric display with keypad 3, allowing the settings of the system parameters and the control of the whole system. It should be pointed out that present similar systems require, the use of a external and/or remotely arranged PC for achieving those same functions.

On the contrary, by the above solution, the inventive radar system is completely independent from external PC for performing system starting, setting and stopping operations, communicating with the system and process data acquired, thereby solving all problems related to conveying and use external handheld PCs on field.

Moreover, said power supply and connection unit 1 further comprises a buffer battery 17 allowing the system to be power supplied for short times, even in a case of a temporary failure of the power supplied through the cable 4.

Moreover, said buffer battery 17 and power supply unit 18 may dialogue with the measuring head 7, that includes the main system control unit 21, in this way the main system control unit 21 has all information related to the power supply parameters and status.

In a power supply failure event, the main system control unit 21 will interrogate the buffer battery 17 and power supply unit 1 about their status and it will send to remotely located users failure notices, by e-mail or sms/MMS messages.

The above messages are sent by the connection modules included in the power supply and connection unit 1 which further includes a GSM/GPRS/UMTS transmission and receiver module 14, to hold a dialogue with remotely operators or systems by means of mobile phone connections. The module comprises moreover an outer antenna 58 for the GSM/GPRS/UMTS connection.

A WLAN module 15 embedded in the system coupled to an additional external antenna 41 through a coupling cable 38, which may also be used to send data and information to remote user and to control remotely the system and a LAN module 16 embedded in the system in order to connect the system, by an Ethernet cable 39, to a communication network, if it is intended to built-in the system in a network already present on the field or specifically designed to manage emergency conditions.

Thus, by SMS/MMS messages and e-mail, it is possible to receive from the system, according preset conditions or as preset events or failures occur, information related to the system status with action or correcting operations are being performed by the system on said events.

For example, as a power failure or exhaustion of the buffer battery occurs, the system will send an alarm sms/MMS and/or e-mail to desired users providing a notice that the system is being automatically stopped within minutes and then restarted again, as the power supply will be recovered.

More specifically, as the power supply is recovered, the main control unit module 21 inside the measuring head 7 will detect such an event and reset the operation of the overall system restarting the acquisition operations which have been interrupted immediately before that event, and will send a SMS/MMS or e-mail related to the power recovery, so as to re-actuate said modules 14, 15 or 16.

Said unit 1 further comprises a non-volatile storage unit 19, for storing system data and information. The embedded storage unit 19 is accessible at every desired time for performing, for example, off-line analyses at other remote places.

The embedded communication lines 38 and 39, together with the antennas 37 and 41, allow the system to operate autonomously without any external assistance or human intervention.

In particular, if the system is used in an emergency condition, system's gathered data and information will be available on-line and in real time for users located at safety locations spaced even by kilometers, through the WLAN connection.

As stated, the power unit 1 is permanently connected, through the umbilical cable 5, to the measuring head 7 constituting the core of the system and including the embedded electromagnetic signal generator and receiver unit 20, the embedded main control unit 21, the embedded GPS module 22 for georeferencing the system on field, an embedded digital videocamera/photocamera 23 for visually controlling and displaying the monitored objects and generating an observed scenario digital elevation model by means of photogrametric technique, as well as the embedded motor control unit 24 and signal acquisition I/O module 25, and zero and runout sensors 26 installed on the linear unit 6.

The embedded GPS module 22 supplies absolute positions of the carriage along the linear unit 6 holding the measuring head 7 at any points on the rail. Thus, from the set of the positions subsequently occupied by the measuring head 7 along the rail in a whole scan measured by the GPS module 22 it is possible to achieve the linear unit middle point coordinates and/or the linear unit location and direction in the space according an external and independent from the inventive system geographic coordinate system.

Thus, after having achieved the above set of step positions and after having measured the linear unit geographic location and direction using an available observed scene digital elevation model, it is possible to embed into the system's focusing software as an input the spatial position, direction of the system and the digital elevation model of the observed area, in order to allow the inventive system to produce, on field, the three-dimensional and georeferenced results according to an external and known geographic coordinate frame.

If this is not enough accurate, or if it is not possible to use the GPS receiver because of an excessively small signal strength or if a ground digital model is missing, then the system embed some reference point, whose location is fixed and pre-set in order to survey its anchoring plates by theodolite or total station in order to locate the said system in an external absolute coordinate system or frame (WGS84, Gauss-Boaga, and so on) thereby allowing, by photogrametric techniques, to reconstruct or achieve, by the digital videocamera/photocamera 23, a ground digital model or target point clouds.

The embedded digital videocamera/photocamera 23 is built-in in the movable measuring head 7 and it is optically calibrated that, by driving it through linear unit set step, it is possible to obtain different snapshot sequences which may be transformed, by dedicated "multi-focal" algorithms, into digital elevation model or point clouds of the observed scenario.

This digital elevation model, representing the monitored scenario, may also be obtained by a separated laser scanner, mounted on the reference counter-plate 8, the reference counter-plate present some pre-set and fixed anchoring point to allow to mount a laser scanner. Thus, by disassembling the measuring head 7 and assembling said laser scanner, it is possible to start a three-dimensional scanning of the observed scene from a known position and direction. On the contrary, if, within a preexisting digital elevation model (DTM), the absolute location of the inventive radar system is already known, then it is possible to built-in displacement maps including three-dimensional coordinates of the observed scenario using the said DTM loaded in the said system by using the embedded LAN or WLAN communication lines 38, 39 respectively.

The measuring head 7, including the embedded modules 20, 21, 22, 23, 24 and 25, is so constructed as to provide a self-bearing frame and a reference framework supporting the antennas 10 and 11, and the mechanical module 9 for orienting said antennas on the vertical plane.

The radar system according to the present invention may be installed outdoors, having a suitable protection degree against atmospheric agents and dust.

The counter-plate 8 is clamped to the measuring head 7 outer structure for connecting the linear positioner 6 movable carriage and said measuring head 7.

The counter-plate 8 and the measuring head 7 bottom part striker plate are equipped with one or more locating elements and a locking connection arrangement for providing a suitable precision degree mutual coupling.

This approach allows to disassemble the measuring head 7 from the linear unit 6 thereby facilitating transport operations. Moreover, if repairing or maintenance-servicing operations must be carried out, it is possible to reassemble the instrument arrangement again with a suitable precision degree, thereby permitting measurements to be carried out also after the above operations.

The removable connections and positioning elements are designed to provide a perfect and repeatable coupling of the components, using reference plane and points.

The reciprocal pieces positioning is made by suitable references with geometrical shapes such as cylindrical, conic, parallelepiped, spherical, trapezoidal, star or cross or grooved profiles.

Such a removable connection provides a perfect coupling of the counter-plate 8 and the measuring head and it is carried out using screws, rivets, ¼ or ½ turn screws, and so on.

The counter-plate 8 is permanently connected to the linear positioner 6.

The positioning references are permanently coupled to the linear positioner 6 movable carriage counter-plate 8, but if necessary they can be disassembled and assembled again to perform component repairing operations.

This approach allows to disassemble the linear positioner 6 for carrying out the repairing operations and assemble again the counter-plate 8 with the proper precision degree, to allow measurement to be carried out also after having performed maintenance and servicing operations.

The measuring head 7 comprises a mechanical module for moving and orienting the electromagnetic wave transmitting 10 and receiving 11 antennas through a vertical plane in order to point them towards the target scenario along the most performing direction.

Such mechanical module allows the two antennas to be rotated on the vertical plane.

This movement may be either a continuous or a step-by-step movement in which, upon having found a desired or target position, it is possible to firmly clamp the component 9 for the overall measurement period.

The transmission 10 and receiving 11 antennas are restrained to the measuring head by one or more locating elements and a movable shape reference allowing said antennas to be coupled to the measuring head 7 with the desired precision degree.

This approach allows the antennas 10 and 11 to be disassembled and replaced by others having different characteristics that might be more suitable to the particular phenomenon being examined; moreover, in shipment and maintenance operations it allows the antennas to be disassembled and re-assembled again with a proper precision degree in order to carry out and compare previously performed measurements at different sites.

The locking connections and the positioning elements are built to assure a perfect and repeatable coupling of the components 10, 11, 7 and 9.

This positioning is carried out by suitable references with geometrical shapes such as cylindrical, conic, parallelepiped, spherical, trapezoidal, star or cross or grooved profiles.

Such a lockable connection allows to achieve a perfect coupling of the components 10, 11, 7 and 9, and is performed using screws, ¼ or ½ turn screws, and so on.

The linear unit 6 comprises an electric motor 13 including a geared unit, for driving the movable carriage to which the counter-plate 8 and hence also the measuring head 7 are restrained.

The geared motor unit 13 is controlled by the main system control unit 21 through the motor control module 24.

On the linear unit 6 are installed safety limit sensors 26 which define the positions of the edges of the allowed run along the linear guide and transmit a zero and an end limit signal to the I/O module 25 which, in turn, dialogues with the motor control module 24 exchanging information with the main system control unit 21.

The linear unit 6 is constituted by one or more parallel linear positioner whose lower sides are equipped with two or more plates 12 and related counter-plates 40 to allow the system to be installed on field. The counter-plates 40 are meant to be permanently anchored to the supporting base 30 or 31 or 32.

In order to be installed on the system pedestal counter-plates 40, the plates 12 interfaces include coupling features like shape connections allowing a mutual positioning with a suitable precision degree, and lockable connections to assure a proper coupling during the acquisition operations.

The mutual positioning of the plate 12 and counter-plate 40 is carried out by suitable referencing geometric (cylindrical, conic, parallelepiped, spherical, trapezoidal, star or cross) shapes.

The lockable connection assures a perfect coupling between the two components and counter-plates 12 and is performed by screws, ¼ or ½ turn screws, and so on.

Figures 4A, 4B:
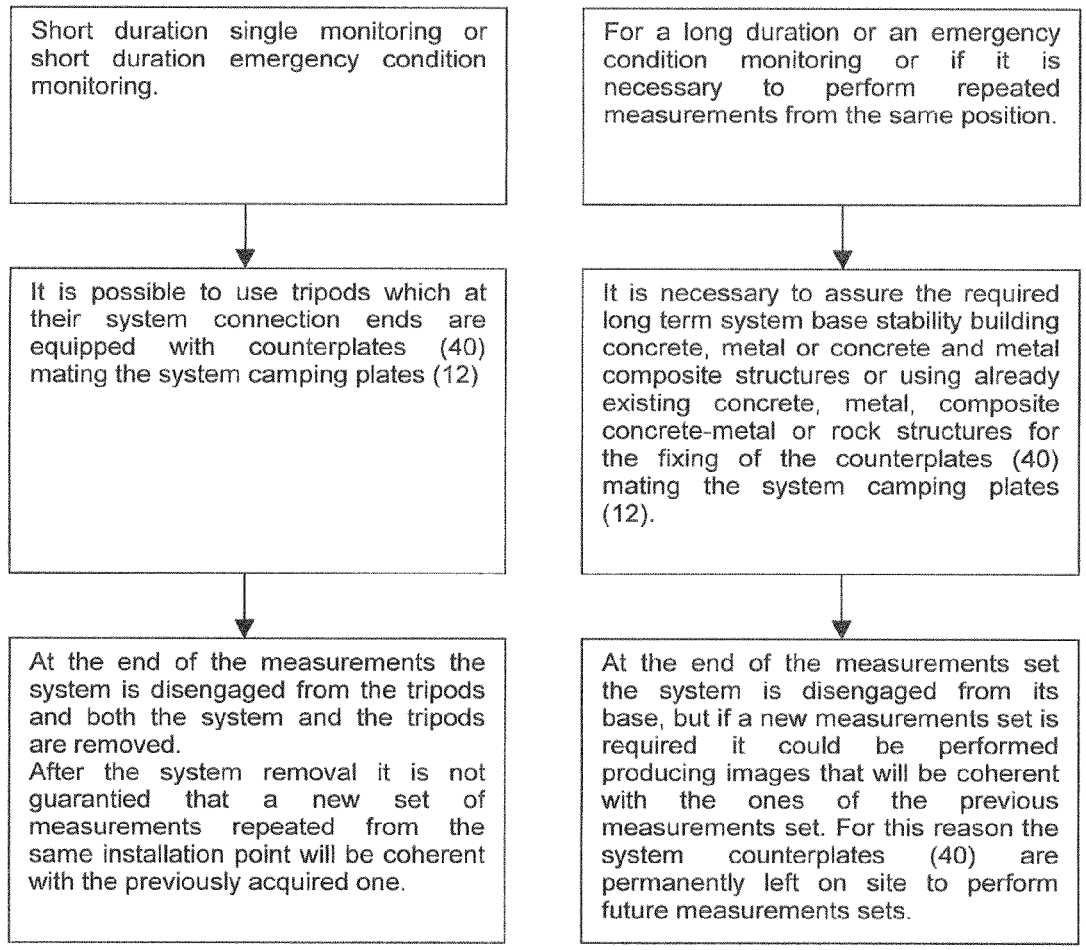
FIGS. 4a and 4b are diagrams showing the assembling procedure for the system assembling schemes based on a functional order.

For short duration or emergency monitoring operations the counter-plates 40 can be fixed to tripods 30 having a suitable stability in relation to the duration of the monitoring. On the other hand, for long duration or repeated measurements, the counter-plates 40 are anchored to pedestals made of cement or concrete structures 31 or composite bases made cement or concrete columns and metal beams 32, as schematically shown in FIGS. 4a and 4b.

The plates 12 are provided with embedded and fixed location standard housing for conventional topographic instrument reflectors.

This approach allows to detect the system positioning and orientation to immediately achieve a spatial georeferencing of said system and allow measurement results to be supplied to reference frames different from the system's one.

This connection comprises a vertical shaft with a top slot for matching with a standard size detection mirror or reflector corresponding shaft.

Thus, anyone having an instrument arrangement for performing topographic measurements may easily locate the mirrors or the reflector elements at the measurement points to quickly retrieve the system spatial coordinates.

Since the above reference points are factory pre-set and built, after having achieved the topographic coordinates of all the plate references, the calculation of the system spatial positioning and orientation can be immediately performed.

The above disclosed system provides a novel operating mode that greatly improves the monitoring performances compared to the ones of the prior instrument arrangements.

The novel operating mode allow the system to be disassembled into three components to facilitate its transport also to impassable places: the three components are the power supply and connection unit 1, the linear unit 6 and the measuring head 7.

The system, depending on the specific needs, can be installed on pre-made permanent bases 32 or 33 in case of a previously planned monitoring service, or on quickly deployable trestles 31 in case of an emergency monitoring installation.

The system counter-plates 40 are then permanently fixed on the installed bases using studs, screws, or welding.

If trestles are used, the counter-plates are attached on the head portion of the trestles; after having located and fixed the counter-plates, the linear positioner 6 may be easily and quickly installed and clamped thereon, and the measuring head 7 will be then attached on the linear positioner 6.

The power supply and connection unit 1 is located close to the system. It is connected to the linear positioner 6 and to the measuring head 7 through the umbilical cable 5, and to the available power supply through the power cable 4.

If necessary, a LAN data transmission cable 39 can be further connected to embedded plug, and the wireless data transmitting antenna 41 can be connected to embedded plug through the cable 38.

Transmitting and receiving antennas 10 and 11 are chosen depending on the specific application characteristics, and mechanical module 9 is used to adjust their orientation towards the target area.

The system is now ready to be switched on through the main switches 2 on the power supply and connecting unit 1.

Using the embedded display and the alphanumeric keypad 3 all the measurement parameters may be quickly selected and the measurements can be started.

The measuring head 7 will then start moving with a constant speed forward and backward along the linear positioner 6 acquiring data in "on the fly" acquisition mode.

Figure 5A:
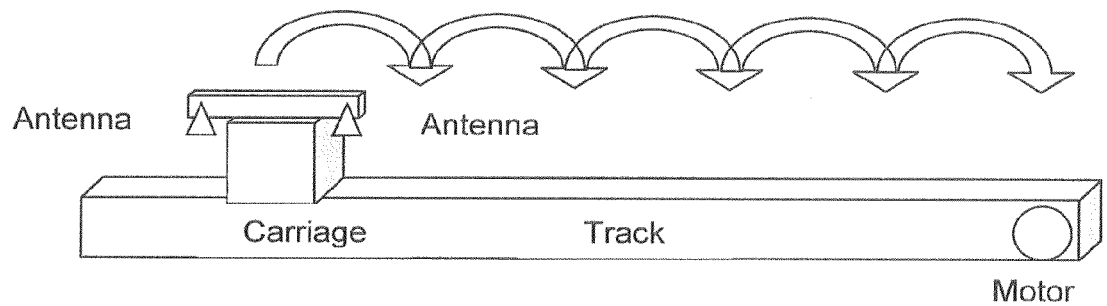
FIGS. 5a and 5b schematically show the two measurement modes of operation, "Stop & Go" (FIG. 5a) and "On the Fly" (FIG. 5b) implemented by the inventive system; the first is the conventional one and the second is the inventive one.
Figure 5B:
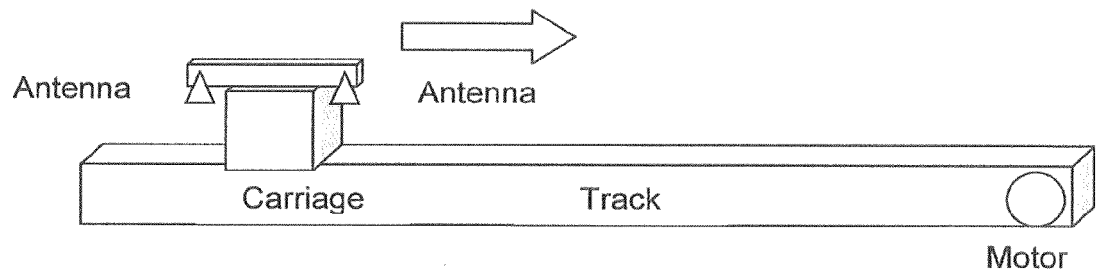

At this stage instead of the "Stop & Go" mode of operation, wherein for each scan the carriage moves and stops in various hundreds of different steps along the track to perform the single measurements (bursts of N frequency bands for each step), it is used the "On the Fly" one, wherein the carriage moves at a constant speed while bursting and acquiring data continuously along the rail without any stop, as shown in FIGS. 5a and 5b.

The "On the Fly" mode of operation is differentiated by the "Stop & Go" one, since it does not require to stop and start again hundred times for each single data acquisition, but achieves continuously the measurements while moving at a constant speed rate along the overall measurement trajectory, exception made for the first and the last part of its path where the acceleration and deceleration ramps are performed.

Thus, by eliminating the start and stop times, and the accelerating and decelerating period between the different measurement steps, the data acquisition operation speed is greatly increased.

This operating mode implies that it is essential to know the precise point along the linear positioner 6 where each single measurements have been carried out.

There are two solutions implemented by the inventive system that can be used to determine the measurement positions:

1—Oversampling the acquisition step so that the positioning errors will become negligible without the need of acquiring the measuring head 7 driving carriage positions; for example, if 401 acquisition points are normally required on a two meters track, that is a point each 5 millimeters, then in the continuous mode it could be possible to acquire about 4001 positions, that is in average a position each 0.5 mm; this means that we will have spaced acquisitions with errors of the order of a few tenths of millimeter providing upon interpolation, truly negligible errors.

2—Alternatively it is possible to achieve an acquisition perfectly synchronized with the carriage instantaneous position. In this case, different acquisition methods may be used of which three are herein suggested by way of an example only, since any other number thereof could be used without departing from the inventive scope. The first method uses a physical trigger generated, each time a measurement is started, by the electromagnetic wave generating and receiving module 20 so that the carriage (and consequently the measuring head 7) position is obtained for all the measurement step. The second technique also uses a physical trigger, which is generated by the motor encoder or by a linear encoder each time the carriage (and consequently the measuring head 7) covers a set (usually few millimeters) distance; the generated trigger is used to start the electromagnetic wave generating and receiving module 20 measurement operations. Finally, the third method uses a software synchronization causing the measurement and carriage (and accordingly the measuring head 7) position acquisition operations to simultaneously start.

Figure 6A:
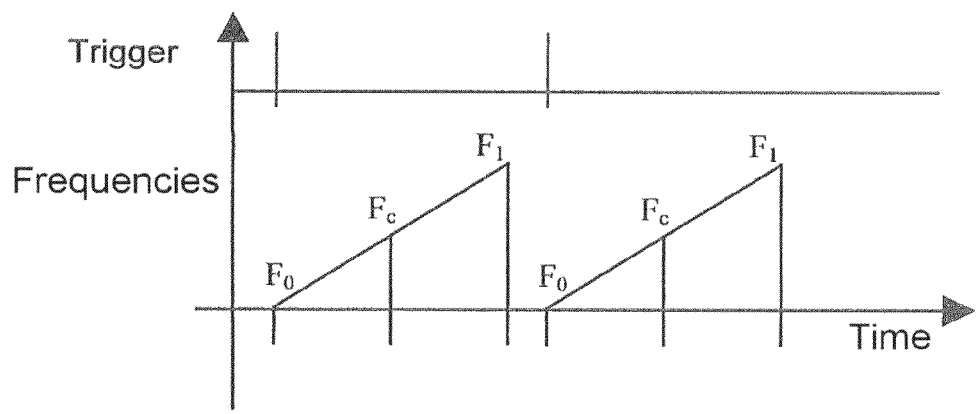
FIGS. 6a-6c schematically show three techniques to perfectly synchronize the acquisition with the instantaneous position of the carriage in the "On the Fly" measurement operating mode method: with a physical trigger generated by the microwave module (FIG. 6a), with a physical trigger generated by the motor encoder or a linear encoder (FIG. 6b) or with a software trigger (FIG. 6c)
Figure 6B:
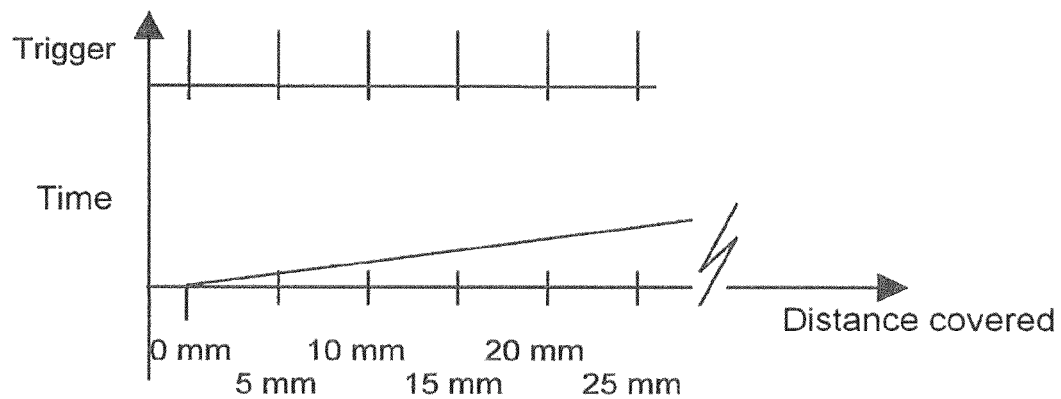
Figure 6C:
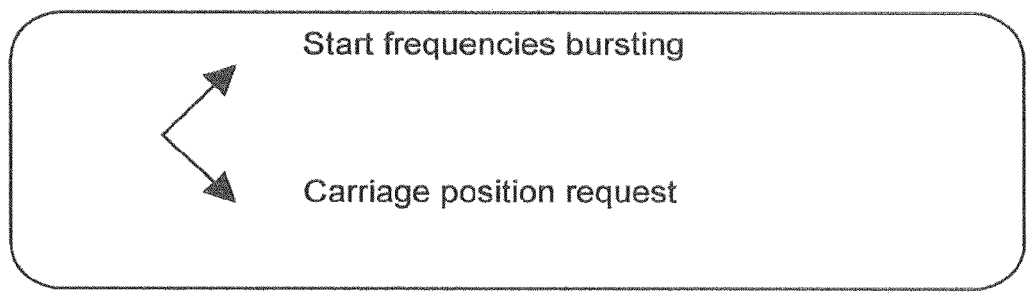

This exemplary procedure is shown in the herein enclosed diagrammatic FIGS. 6a-6c. In detail:

Physical trigger I (FIG. 6a)
  For each frequency band transmission, the electromagnetic signal generation and receiver unit generates a trigger which activates the motor control unit to detect the carriage position;

Physical trigger II (FIG. 6b)
  Every time the carriage has covered a certain number of millimetres, the rotary encoder (or a linear encoder) generates a physical trigger which activates the electromagnetic signal generation and receiver unit to start a single burst;

Software trigger (FIG. 6c)
  The main system control unit software cycle synchronizes the starting of the single burst by the electromagnetic signal generator and receiver unit with the carriage position request, oversampling the data.

The embedded microwave generating and receiving module 20, controlled by the main system control unit 21, comprises a continuous-wave stepped-frequency scatterometer which includes polarimetric mode of operation.

Said module 20 also operates as a microwave signal synthesizer providing a signal which, upon amplification by the amplifier 43 and an optional frequency conversion, is sent to the transmitting antenna 10.

A portion of the transmitted signal is feedback through the microwave coupler 27 to the scatterometer to provide a suitable coherence of the transmitted and received signals.

The signal source generates sets of continuous wave (cw) signals having frequencies between f1 and f2, with a preset sampling frequency step of delta F.

The transmission is therefore based on the emission of continuous electromagnetic waves with stepped-frequency variations. In other words, this method consists of a transmission for each step along the linear unit 6 of subsequent monochromatic N-pulse bursts, where a generic k-th pulse is characterized by the frequency fk=fo+kΔf (k=0, 1, 2, N-1).

A second antenna 11, equal to the first one 10, is herein used to receive the backscattered signal and to convey it to the receiver that will perform the target measurement operations.

The synthetic antenna is achieved by driving the system (measuring head 7, antenna support 9 and antennas 10 and 11) through P steps along a rectilinear trajectory.

At each p-th step, a measurement is performed. While the "Stop & Go" measurement, just described, mode of operation provides to measure while the measuring head has a zero-speed at each step, in the "On the fly" mode of operation each measurement point corresponds to a measurement step characterized by V=constant.

For each said step, the received signal is sent to the microwave generating and receiving module 20 that measures, for each sampled time, the signal I and Q components, and then digitizes and saves them in a dedicated memory.

At the end of the linear positioner scanning operation, in both the above "Stop & Go" and "On the fly" operating modes, a complex number matrix of size P×N (where P=number of the step, N=number of frequencies acquired for each step burst), will be obtained and saved on embedded storage unit 19 to be further processed by the main system control unit 21. In the "On the fly" measurement mode of operation, with the trigger software, the matrix is generated by oversampling data along the linear unit, that means that the value of each element of the P×N matrix is the result of a bi-dimensional (either linear or of a higher order) interpolation of all the measurement acquired by the measuring software along the linear path, therefore the number of these measurements should necessarily be greater than P.

Figure 7A:
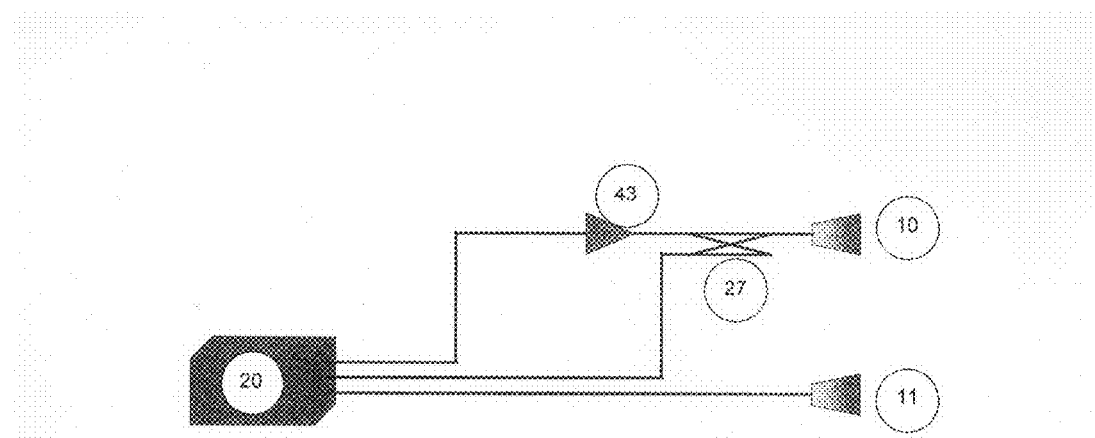
FIGS. 7a and 7b show a conceptual diagram of the construction of the module (FIG. 7a) and the signal emitted and received for the p-th position along the linear positioner (FIG. 7b)
Figure 7B:
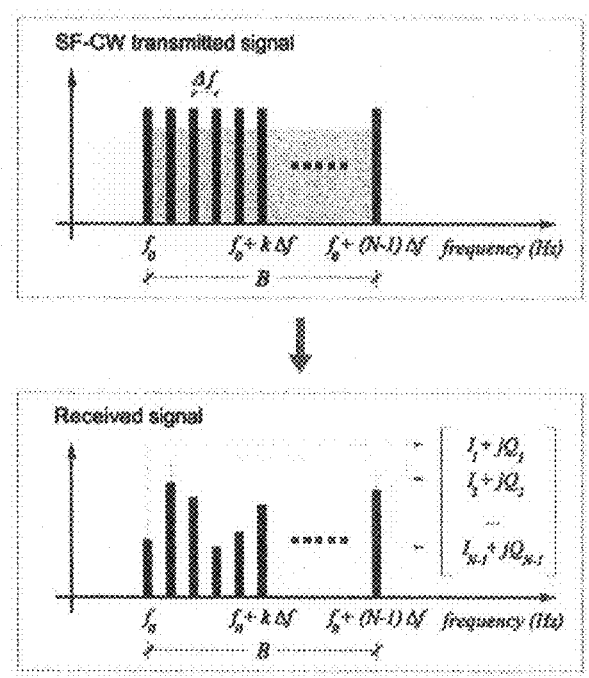

A basic schematic diagram of the module 20 and the emitted and received signals for the linear positioner p-th step are shown in FIGS. 7a and 7b, wherein FIG. 7a is a conceptual diagram of the electromagnetic signal generator and receiver unit (a); and FIG. 7b is a conceptual diagram of the emitted and received signal for the $p^{th}$ step along the linear positioner.

In particular, after having acquired data through the overall linear unit path, the main system control unit 21 will acquire from the module 20 the P×N complex number matrix and automatically processes it to achieve a single high resolution radar image.

The main system control unit 21 is designed to receive frequency domain data as input data, to quickly focalize them and supplying at its output a high resolution radar image.

By using specifically designed algorithms, the image processing procedure has a duration of a few seconds.

Figure 8A:
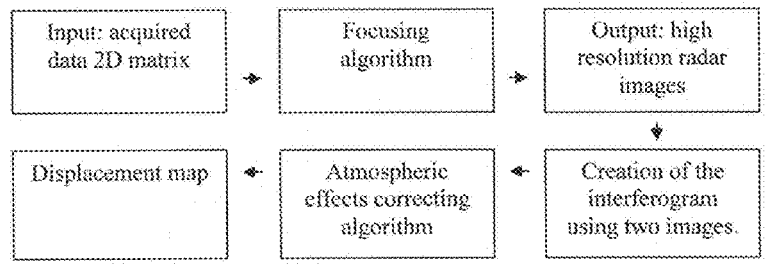
FIGS. 8a-8c show a block diagram of the system image processing and the acquired data.
Figure 8B:
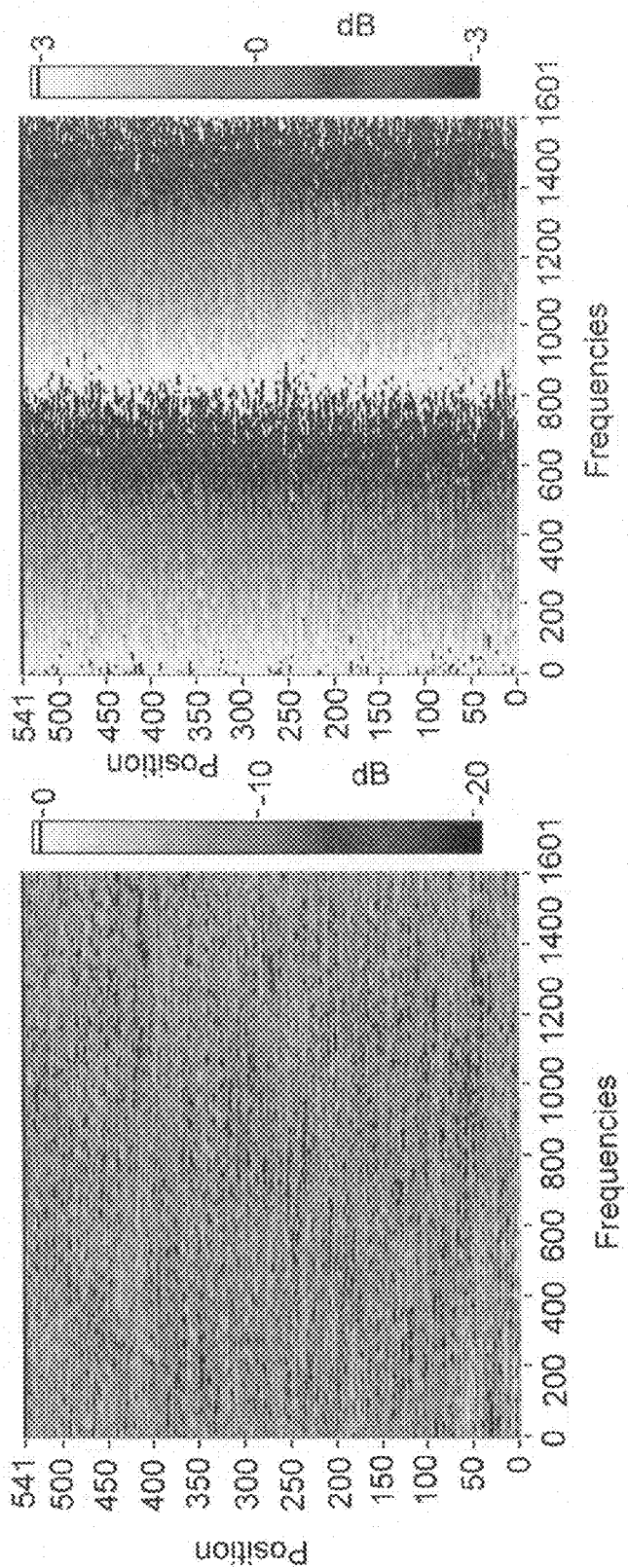
Figure 8C:
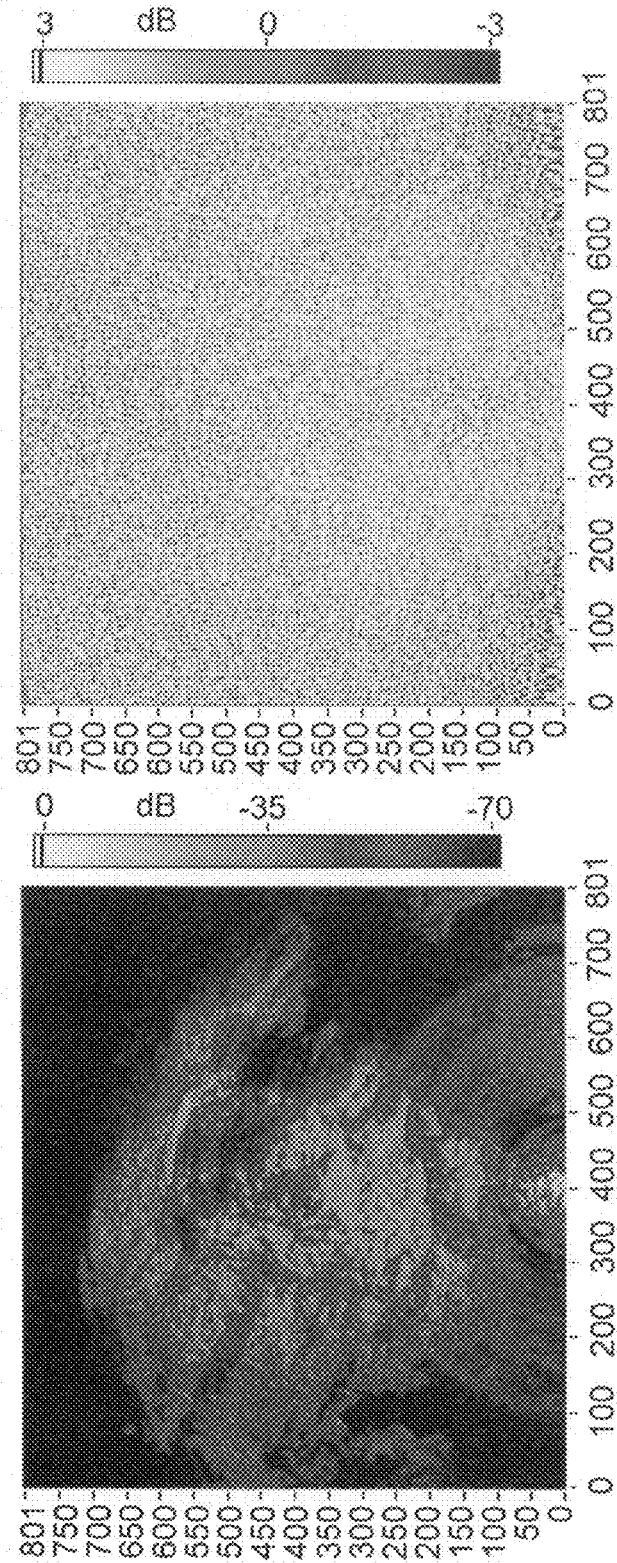

An exemplary procedure block diagram is shown in FIGS. 8a-8c, wherein FIG. 8a shows an image processing implemented by the module 21; FIG. 8b shows complex raw data acquired in the frequency domain and represented by amplitude (on the left) and phase (on the right); and FIG. 8c shows complex high resolution radar images represented by amplitude (on the left) and phase (on the right).

Figure 9:
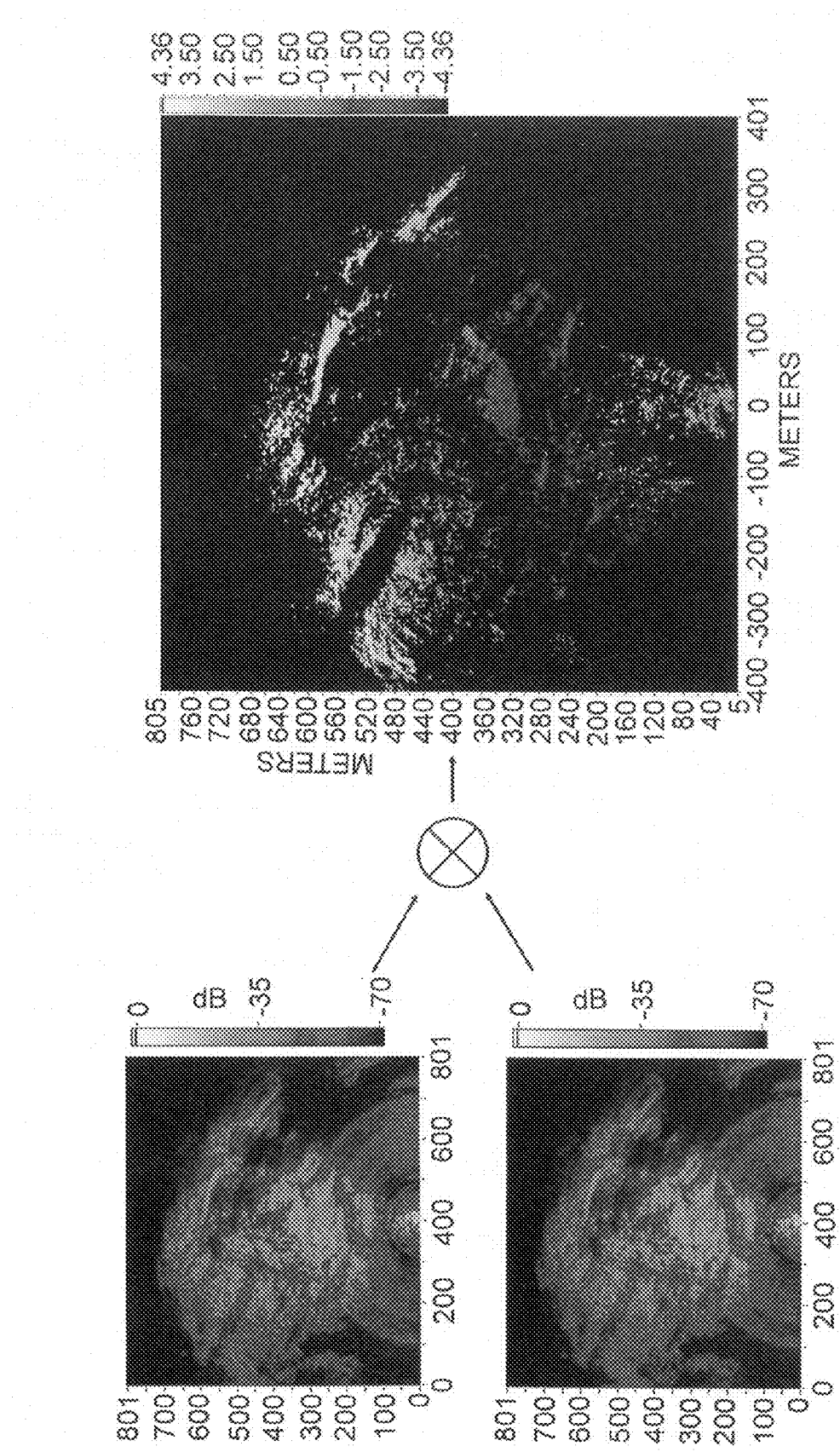
FIG. 9 shows a method for achieving a third (complex) image, the so-called interferogram, using two (complex) images of that same scenario. From the computed interferogram it is possible to derive the displacements of the objects present in the observed scene.

Using two (complex) images of the same scenario, it is possible to achieve a third (complex) image, the so-called interferogram, from which it is possible to derive the displacements of the scenario objects (FIG. 9).

An interferogram, however, is usually affected by atmospheric noise which must be corrected to achieve the real displacement measurement.

Figure 10A:
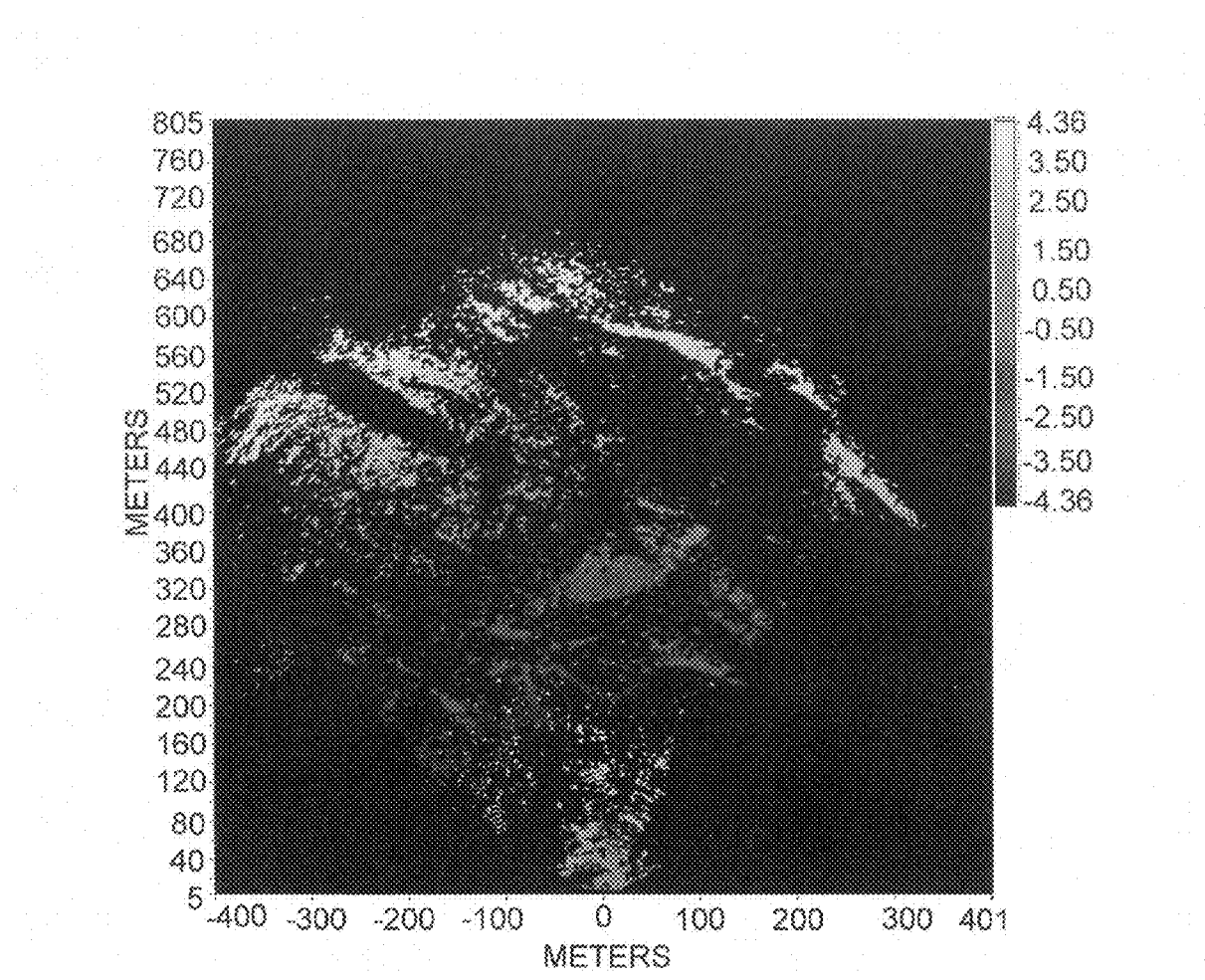
FIGS. 10a and 10b show the application of the correcting algorithm. The aim of such algorithm is the removal of the atmospheric effects components and the achievement of the real displacement measurement.
Figure 10B:
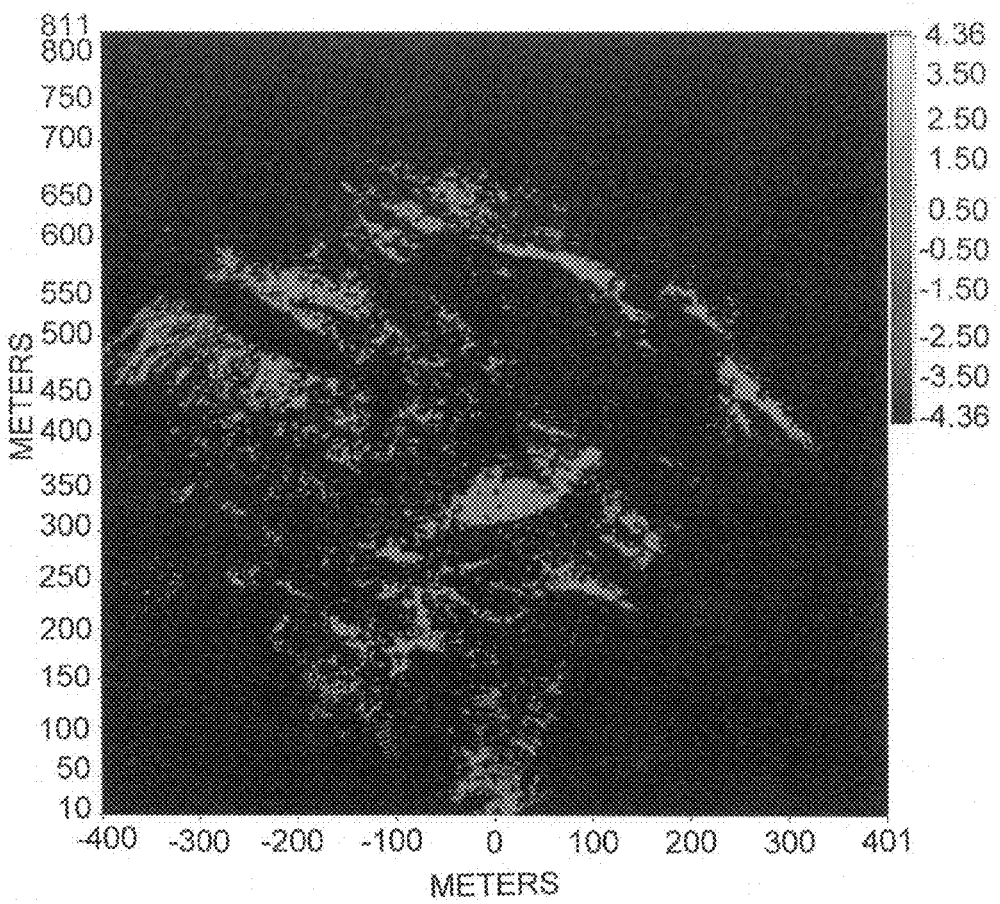

Such a correction is performed by the main system control unit 21 applying an image correction algorithm, which results in the elimination of the atmospheric effects component, as it can be seen in FIG. 10a, wherein an atmospheric noise affected interferogram is shown having an interference fringe extending from the bottom to the top of the image due to different atmospheric conditions at the times when the images were acquired; and in FIG. 10b, showing a displacement map wherein the atmospheric effects have been corrected.

The corrected images are saved by the module 21 in the embedded module 19, providing a high resolution corrected radar image continuous series.

If the system has been furthermore georeferenced and equipped with a DEM then the images are also 3D processed and saved in the in the embedded module 19.

The module 21 processes the image continuous series either in a 2D or 3D mode to provide the displacement map covering the time period that has been selected by the user by means of the alphanumeric display with keypad 3.

The above displacement maps covering a long time period, are made immediately available to the user directly by the module 21 in two formats: one directly achieved by comparing the images corresponding to the selected time period, and the other indirectly provided by a procedure designed to add the measured displacements in subsequent interferogram pairs, covering the target time interval.

In each individual step of this latter mode of operation, the user can also select a number of points and display the related displacement and speed pattern between a step and a next one, thereby also allowing to set alarm thresholds for each individual point, which thresholds as they are exceeded, that will cause the embedded module 21 to generate alarms and send SMS/MMS, e-mail or sound communications to all the involved users through the embedded GSM/GPRS/UMTS 14, WLAN 15, LAN 16 modules or the I/O module 25.

Thus, by a remote connection to the system, the user can immediately analyze data and, in particular, can perform the following operations:
- displaying 2D or 3D displacement maps, which are immediately made available by the system by directly comparing the two images related to an interval arbitrarily selectable by the user;
- displaying the 2D or 3D displacement maps which are immediately made available by the system by adding the measured displacements in subsequent interferogram pairs (cumulative displacements), covering the time interval arbitrarily selectable by the user;
- selecting a suitable number of points and, for each individual acquisition and for the overall arbitrarily selected interval, calculating and displaying the displacements and the speeds for each selected point;
- selecting and displaying alarm thresholds related to the speed and to the displacement values of the selected points to provide SMS/MMS, e-mail or visual and/or acoustical alarms;
- displaying optical images, even from a remote location, of the observed scenario as acquired by the module 23 and reconstructing the point cloud or the digital terrain model of the scenario by using the optical images acquired by said module 23 and processing them using suitable multifocal algorithms;
- achieving information on the georeferencing pattern acquired by the module 22 to correlate measurements to other coordinate systems.

Moreover, through the mechanical interface module it is possible, by using a laser scanner, to integrate radar data with a digital elevation model achieved by the laser scanner in order to perform further analyses in a three dimensional and georeferenced frame of reference.

The novel system may also operate in a remote mode of operation allowing the user to quickly visualize all the needed data simply by using embedded remote connection to the system.

Figure 11A:
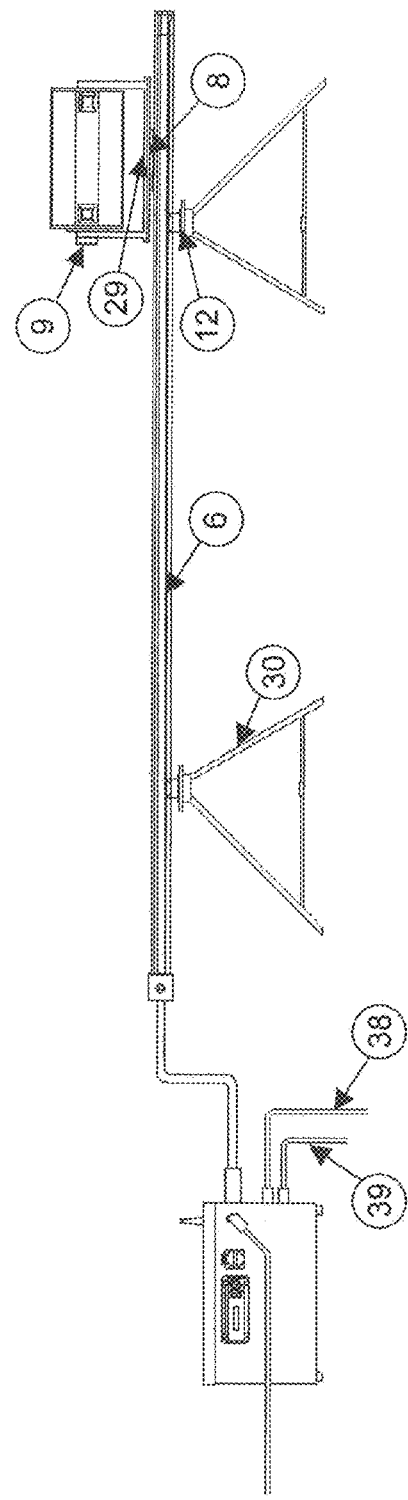
FIGS. 11a and 11b are schematic views showing, respectively, by a front view (FIG. 11a) and by a top plan view (FIG. 11b), a system installed on two tripod arrangements.
Figure 11B:
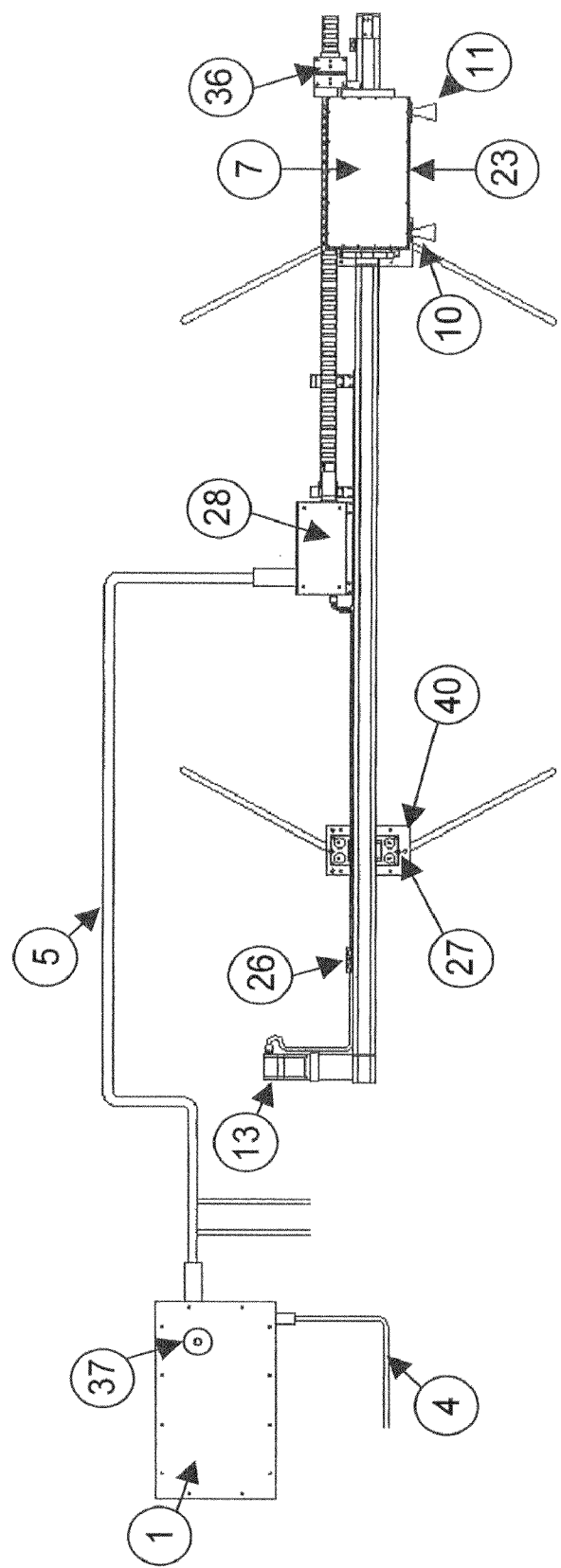
Figure 12A:
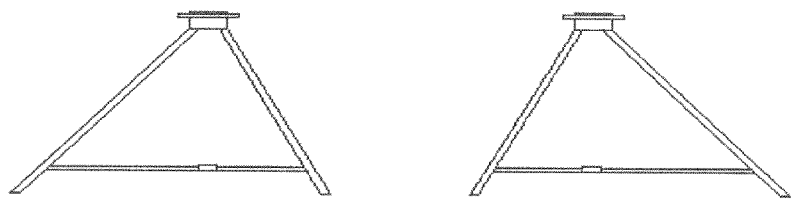
FIGS. 12a-12c show three different pedestal types: a quickly deployable mechanical tripod (FIG. 12a), a permanent concrete base (FIG. 12b), a permanent base including pillars and a H-shape metallic beam (FIG. 12c)
Figure 12B:
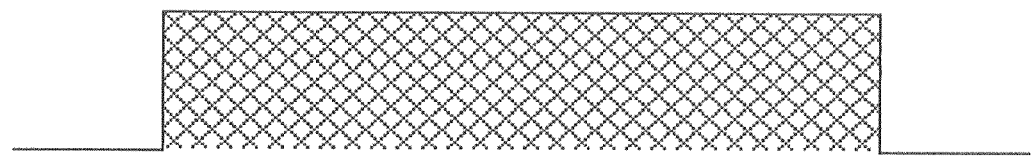
Figure 12C:
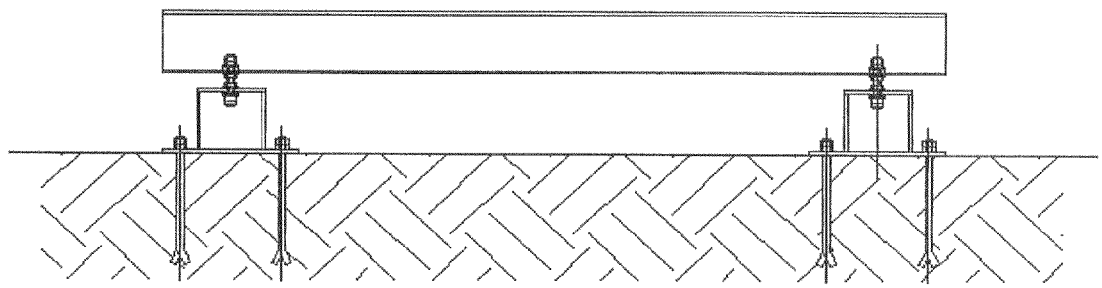

With reference to FIGS. 11a and 11b, an exemplary embodiment of the invention will be disclosed hereinafter.

While this inventive embodiment discloses a system installed on two tripods 30 including anchoring counter-plates 40 directly mounted on the tripod head portions, the same inventive idea may also be applied using pedestals made of any desired materials and to any desired connections, such as, for example, cement or concrete pedestals 31, or composite cement (or concrete)/metal structures 32, in which two cement or concrete column elements support, by supporting studs, an H-shape metal beam, on the top wing of which it is possible to mount, by studs, screws or weldments, said anchoring counter-plates 40.

The pedestals 30 are suitable in the performing of monitoring operations that does not require subsequent measurement campaigns or a future relocation of the instrumentation. For an emergency situation, the use of quickly deployable mechanical tripods 31 is ideal since it is very important to assemble the system as quickly as possible.

On the other hand, the pedestals 31 and 32 are used in permanent monitoring stations, or when it is necessary to assemble and disassemble several times the system and measure the displacements of observed scenario that took place between two different acquisitions.

The system comprises the power supply and connection unit 1, that is equipped with carrying handles.

Said unit includes the embedded power supply and distributing module 18, the embedded buffer battery 17, the embedded GSM/GPRS/UMTS modem 13 the embedded antenna 37 of which projects above the unit 1, the embedded WLAN 15 module the output of which is connected to the antenna 41 through the connecting cable 38, the embedded LAN module 16 the output of which is connected to the Internet through the connecting cable 39 and, finally, a embedded backup removable module for the data acquired and processed by the sensor 19.

On the outside of the unit 1 are installed in a waterproof manner, the embedded alphanumeric keypad and its display 3, the system main switch 2, the socket for the embedded power supply cable 4 and the one for the umbilical cable 5 used for both the power supply and the data transfer to and from the measuring head 7.

The system further comprises a linear unit 6, equipped with gripping handles and with the zero and the end of track limit switches 26, the geared motor unit 13, the anchoring plates 12 which include the embedded references for topographic detecting reflectors 42, and a clamping counter-plate 8 for clamping the measuring head 7 to the movable carriage of the linear positioner 6.

Said counter-plate has a groove at the lockable carriage interface, allowing it to be properly placed on to the carriage, in order to assure the required tolerance range, and to be fixed by fixing screws to the skid.

The electric connections to the zero and the runout switches 26 and to the geared motor unit 13 are directed towards the junction box 28, which is equipped with a socket to house the umbilical cable 5 that is used for the system data transmission and its power supply.

The junction box 28 conveys all the data transmitting and power supply lines to the measuring head 7 through a cable holder chain, which is permanently installed on the linear positioner 6.

The measuring head 7 has a self-bearing pyramidal parallelepiped shape and it is equipped with handles as well. It is also provided with the antenna adjusting module 9 to which are connected the antennas 10 and 11 and embedded videocamera 23 to provide the observed scenery optical images.

Figure 13:
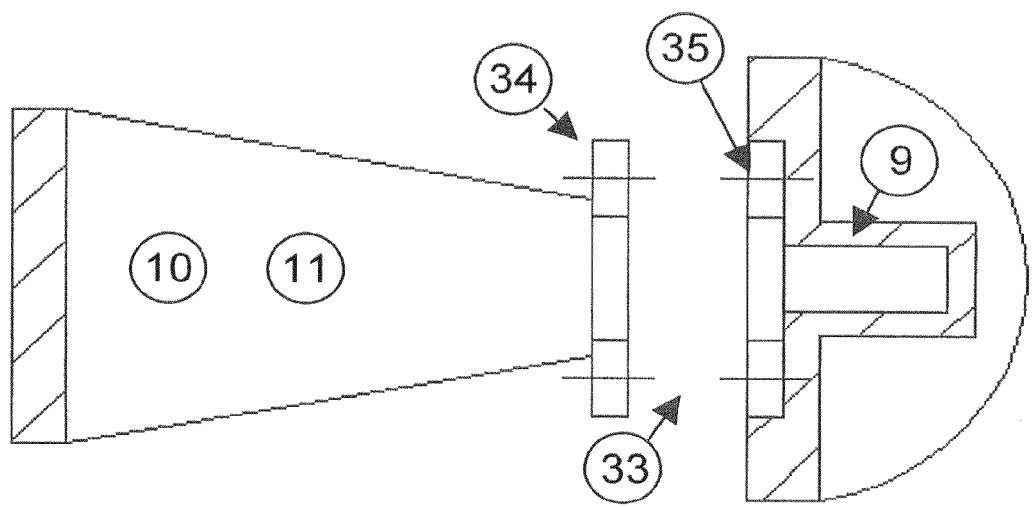
FIG. 13 shows a method for replacing the antennas as required.

Said antennas 10 and 11 can be easily assembled and disassembled or replaced by others, since the adjusting module 9 has, at the antenna interface, a recessed profile 35, as seen in FIG. 13.

In this case, the recessed profile has an hexagonal shape that coincides with the shape of the hexagonal flange 34 of said antennas 10 and 11.

In assembling the system, the flange 34 is fitted into the profile 35; said profile has a size tolerance for the relocation of the single component pieces suitable to the requirements of the measures to be performed.

Finally, clamping screws 33 are used to fix the antenna 10 or 11 to the module 9.

This approach allows the system antennas 10 and 11 to be assembled and disassembled for preventing them from being accidentally damaged in shipment operations.

This also allows the system to be equipped with different antennas types, having different geometric and mechanical characteristics, to better fit the features of the monitored scenario.

The measuring head 7 houses the embedded electromagnetic wave generating and receiving module 20 which is directly coupled to the transmitting 10 and receiving 11 antennas and is controlled by the embedded main system control unit 21.

Said unit 21 is coupled to a embedded GPS module used to provide information on the system spatial placement, to the embedded calibrated digital videocamera/photocamera 23, to the motor control module 24 and to the input and output I/O control module 25.

The above modules 21, 24, 25 are respectively coupled to the unit 1, to the geared motor assembly 13 and to the zero and the end of track limit switches 26 through the connecting cable 36 held in the cable holder chain.

The measuring head is also provided, on its bottom face, with an abutment element used to perfectly fit to the counter-plate 8 of the linear positioner 6.

On the linear positioner 6 counter-plate 8 are formed ridge inserts for engaging in corresponding recesses provided on the bottom face of the measuring head 7 thereby allowing the latter to be easily assembled to and disassembled from the linear positioner 6 with a suitable precision degree.

The fixing is performed by using ¼ turn fixing screws and quick connectors for speeding up the installing operations.

The counter-plate 8 is equipped with the embedded flange 29 to allow the possibility to install a laser scanner that is used to provide a digital elevation model of the system's observed area, allowing an easy integration of the data achieved by the two monitoring systems (the radar and the laser scanner).

The counter-plate 8 and measuring head 7 module 9 are equipped, on their sides corresponding to the linear positioner zero, with an abutment and a detent element allowing the modules to be always assembled and disassembled with the same precision degree and at the same position with respect to the system zero point, allowing mounting and dismounting the system and having always the coherence between different acquisitions.

The inventive procedure provides that the units 30, 6, 7, and 1 (respectively: tripods, linear positioner, measuring head and power supply and connection unit) can be separately transported to the system installing place.

Upon arriving at said place, the tripods 30 will be deployed and, by the counter-plates 40 arranged on their head portions, they are coupled to the linear positioner 6 plates 12.

This coupling is performed by a cylindrical element projecting from the counter-plate 40 and perfectly nesting into a corresponding recess of the plate 12.

Then, the connection is completed with quick coupling ¼ turn screws.

After having mounted the linear positioner 6 on the tripods 30, the measuring head 7 is mounted on the linear positioner 6 counter-plate 8.

The connection between the measuring head 7 and counter-plate 8 may be easily performed by insert elements which, projecting from the counter-plate, are perfectly nested into a corresponding recess of the plate.

Then, the connection is completed using the quick coupling ¼ turn screws.

The cable 5 is then connected to the measuring head 7. The unit 1 is deployed, the umbilical cable 5 is connected to the junction box 28 of the linear positioner 6, and the power supply cable 4 is connected to the power supply source.

If necessary, the cables 38 and 39 are also connected.

Moreover, by means of the module 9, the antennas are oriented to efficiently point towards the target area to be monitored.

Finally, if necessary, by using the reference marks 42, the reflectors and/or the mirrors to measure the system position using topographic modules for optionally comparing data taken by different geographic systems are installed.

Once all the above connections are established, the main switching assemblies 2 are operated to power supply the system.

After the switch on, the main system control unit performs a control of the status of all the peripheral devices and drive the motor 13 to locate the measuring head at the zero position, while controlling through the zero sensor 26 and I/O module 25 the command execution.

After having performed the zeroing operation, the user may employ the embedded alphanumeric keypad and the display 3 to select the optimal system configuration by setting the measurement parameters, and to start the acquisitions.

As soon as the main system control unit 21 receives the above commands, it will send further related commands to the embedded electromagnetic signal generating and receiving module 20 and to the motor drive in order to perform the scanning procedure.

The scanning procedure may be executed using either the "Stop & Go" or the "On the Fly" mode of operation.

The "Stop & Go" mode of operation is the conventional procedure to perform radar measurements using ground based synthetic aperture radar systems. In this mode, the system is driven through all the linear unit length and it is stopped for several hundreds of step (typically more than five hundred times) at even intervals (usually of a few millimeters each). At each step the system stops and performs a measure. This mode of operation results in having scanning times of about ten minutes. Such a measurement procedure is particularly suitable in permanent monitoring situations, in which is preferable to restrain the amount of acquired data.

The inventive radar system can also operate in a second mode of operation called the "On the Fly" mode of operation. In this mode of operation the radar system is moved forwards and backwards along the linear positioner at a constant speed, only stopping at the beginning and at the end of the track. During each constant speed travel, the system will burst continuously and acquires data at constant speed necessary to process a single radar image. Since no time is spent to transmit information to drive the system to move through and stop at hundreds of measurement steps, and since, moreover, it is not necessary to accelerate and decelerate each step the system point-by-point on the track, the "On the Fly" scanning is much shorter than the "Stop & Go" one.

In the "On the Fly" operating mode, the single step burst time depends on only the burst speed, that is selected according to the characteristics of the phenomena to be monitored.

Said scanning time may vary from a few seconds to a maximum of about three minutes; thereby this operating mode actually makes the inventive radar system one of a kind and very suitable in emergency conditions.

Independently from the above data acquisition modes, as the measuring head 7 arrives at the end of the linear aperture length, it will move back on the track to its starting position, to start again a novel measurement operation to provide another image.

The system acquired raw data are in the form of a P×N complex number matrix (where P=number of measurements step performed during each scan, N=number of frequencies acquired for each measurement).

The further processing of the above raw data to provide SAR images consists in the focalizing step, the atmospheric effects correcting step and the algorithm controlled image generating step. All these processing steps are carried out in a few seconds, typically corresponding to time period spent by the carriage to return from the end of the track to the zero position.

At the end of each individual scanning, the main system control unit 21 performs a system status control and, if necessary, sends an SMS, an MMS or an e-mail with the fetched information; it also controls whether some SMS or MMS or e-mail containing instructions to be executed, such as a pause, stop and restarting command have been received during the acquisition procedure. If that is so, then the inventive system will execute the above commands.

During the setting-up of the measurements the operator can define a set of points of interests. If these points are set then the main system control unit 21 also measures their displacements, and calculates their speeds. If some alarm thresholds have been set as well, when the main system control unit 21 detects that one or more of the points of interest are exceeding the thresholds then an alarm is emitted, and the inventive system is able to actuate visual or acoustic alarms through the I/O module 25 or to send SMS or MMS through the module 14 or e-mails through the module 16.

At the end of each scanning, the control module obtains, through the embedded videocamera 23, an optical image of the observed scene, which is saved in the store module 19.

The inventive system operates in a fully autonomous and embedded manner, however, if embedded communication lines 38 and 39 are connected, then a user may remotely display the acquired data to have different analyses and options available:

an analysis of the deformation maps for an arbitrarily selected interval, said maps being obtained by directly comparing the image related to the starting time and the one related to the preselected period end time; from this analysis the user can also retrieve the two images power maps and their coherence map;

the possibility to select at will some of the image points, to extract their displacements, coherence and power values and to define the power and coherence thresholds to be applied to the image displaying;

the possibility to obtain the deformation maps for any desired time interval, by adding all the images from the one related to the preselected time period starting time up to the one related to its end time (the so-called cumulative displacement maps); it is also possible to see the image details and display the displacements and speeds of a series of target points (the so-called time series);

the possibility to apply on said displacement and/or speed time series, a number of data noise reducing filters;

the possibility to define alarm thresholds on both the raw and the filtered time series data;

the possibility to directly taking the control of the system, and defining its procedures for sending SMS/MMS and/or e-mail error and status messages.

At the end of the acquisition period, the user, both through the embedded alphanumeric keypad 3 or the embedded LAN or WLAN system connection, may stop and switch-off the system, and, if necessary, may download the saved data from the embedded module 19 to perform optional off-line analyses.

It has been certified through practical experiments that the invention fully achieves the intended aim and objects.

It was in fact built a ground based interferometric radar system with polarimetric capacities which may be installed in a very few minutes and is able to embeddedly acquire, process and post-process data in a processing time much shorter than that of the prior systems. Moreover, the inventive radar system may be set to the "On the Fly" mode of operation that allow acquiring images in faster time and it is very useful for emergency situations.

The inventive system does not require external computers for the setting-up of the measurement parameters, since it comprises a built-in data input display and alphanumeric keypad.

Furthermore, the inventive system include embedded unit to be remotely managed and to send notifications (through SMS/MMS or e-mail) on its general status, both periodically and on demands done by the operator.

The inventive system may be in addition preset to perform system spatial georeferencing operations or may be localized by built-in GPS systems, thereby providing a true possibility of georeferencing the measurement results to absolute coordinate systems (WGS84, Gauss-Boaga, and so on).

The system also allows to embedded produce, using the embedded calibrated digital videocamera/photocamera 23 driven to specific points of the linear unit track, either digital terrain models or a discrete point cloud of the observed scenario.

Finally, the inventive system allows embedded integration of its data with digital elevation models acquired through laser scanners.

In practicing the invention, the used materials, as well as the contingent size, can be any, depending on requirements.

The invention claimed is:

1. A synthetic aperture radar system for monitoring ground and structure movements, said system comprising at least the following mechanical and electronic components: a ground based platform including a measurement interferometric and polarimetric sensor, an embedded power supply and connection unit, a linear positioner provided with a movable carriage, and a measuring head; an embedded main system control unit, an embedded electromagnetic wave generator and receiver module controlled by said unit, comprising a continuous—wave stepped—frequency scatterometer, a motor control and managing unit, an embedded UPS module including an embedded buffer battery; an I/O managing module, an embedded calibrated videocamera or photocamera, an embedded. GPS receiver module, an embedded display and an alphanumeric keypad, an embedded LAN module, an embedded mass storage module, an embedded GSM/GPRS/UMTS module, an embedded WLAN module, and embedded standard interfaces for assembling laser scanners and topographic instrument reflectors; whereby all the mechanical components of said system are provided with unique reference marks and points or connections, characterized in that, to perform a measurement, said measuring head is initially driven along a linear track with a constant speed in an "on the fly" acquisition mode of operation; and wherein during a constant speed movement, the system acquires data needed to process a single radar image.

2. A synthetic aperture radar system, according to claim 1, characterized in that the system achieves a synchronization of an acquired signal with an instantaneous position of the carriage by one of the following alternative modes of operation: providing a physical embedded trigger generated by the embedded microwave generator and receiver module, providing a physical embedded trigger generated by the rotary encoder or by a linear encoder, or providing a simulation of the synchronization with a software trigger.

3. A synthetic aperture radar system, according to claim 1, characterized in that said embedded videocamera or photocamera is of a calibrated digital type allowing to reconstruct or acquire a digital terrain model of a ground and ground representing point clouds, said embedded calibrated digital videocamera or photocamera being built-in in the movable measurement head and calibrated in a way that, by driving it along the track together with the movable measurement head, different position snapshot sequences may be acquired, a set of said snapshot sequences allowing to achieve, through multifocal algorithms, point clouds or digital models indicative of a ground elevation of the analyzed area.

4. A synthetic aperture radar system, according to claim 1, characterized in that said GPS module is embedded in the measurement head and provides an absolute position of said carriage on the track, thereby retrieving, from a set of track carriage positions measured along the track, coordinates of a middle point of the track and its spatial direction according to a geographic coordinate system external and independent from the system so as to georeference the radar system results to an external WGS84 or Gauss-Boaga coordinate system.

5. A synthetic aperture radar system, according to claim 1, characterized in that said linear positioner comprises a plurality of plates and counter-plates, said counter-plates being clamped to tripods, said plates having plate surfaces including an embedded preset assembly for mounting and connecting topographic instruments, such as theodolite and total station detecting mirror elements, by connections consisting of an embedded vertical shaft including a top slot mating with a detector mirror or reflector hollow shaft, thereby allowing to georeference the radar system results into said WGS84 or Gauss-Boaga coordinate system.

6. A synthetic aperture radar system, according to claim 1, characterized in that said embedded calibrated digital videocamera or photocamera, embedded GPS module, and embedded counter-plates measure the system spatial locations to achieve a digital elevation model of a monitored area, thereby the system provides embedded on-field results in a three-dimensional system georeferenced to said WGS84 or Gauss-Boaga coordinate system.

7. An operating method for operating a synthetic aperture radar system, according to claim 1, wherein said method comprises the steps of installing said radar system on a system base including deployable mechanical tripods; wiring the system with two connectable cables, starting the system and setting up the measurement parameters through an embedded display and an embedded alphanumeric keypad; acquiring data moving the measuring head at a constant speed; processing and post-processing data on field by an embedded control and managing module and providing embedded bi-dimensional or three-dimensional maps of a monitored scenario using a measured system spatial location and a georeferenced digital model.

* * * * *